US008566802B2

(12) United States Patent
Kawachiya et al.

(10) Patent No.: US 8,566,802 B2
(45) Date of Patent: Oct. 22, 2013

(54) METHOD OF ASCERTAINING PRIMARY CAUSE OF MEMORY CONSUMPTION IN PROGRAM, AND COMPUTER SYSTEM AND COMPUTER PROGRAM FOR THE SAME

(75) Inventors: Kiyokuni Kawachiya, Kanagawa-ken (JP); Kazunori Ogata, Kanagawa-ken (JP); Michiaki Tatsubori, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 557 days.

(21) Appl. No.: 12/787,797

(22) Filed: May 26, 2010

(65) Prior Publication Data

US 2010/0306596 A1    Dec. 2, 2010

(30) Foreign Application Priority Data

May 29, 2009    (JP) .................................. 2009-130756

(51) Int. Cl.
*G06F 9/44*    (2006.01)
(52) U.S. Cl.
USPC ........................................................ 717/132
(58) Field of Classification Search
None
See application file for complete search history.

(56) References Cited

U.S. PATENT DOCUMENTS

| 5,828,883 A * | 10/1998 | Hall .............................. 717/133 |
| 2007/0143562 A1* | 6/2007 | Raut ............................. 711/170 |
| 2007/0150878 A1* | 6/2007 | Cates ............................ 717/151 |
| 2008/0162547 A1* | 7/2008 | Bonev et al. ............. 707/103 R |
| 2010/0017791 A1* | 1/2010 | Finkler ........................ 717/158 |

FOREIGN PATENT DOCUMENTS

| JP | 2000293400 | 10/2000 |
| JP | 2008-134709 | 6/2008 |
| JP | 2008257287 | 10/2008 |

OTHER PUBLICATIONS

Bond et al., "Probabilistic Calling Context", Department of Computer Sciences, The University of Texas at Austin, Oct. 21-25, 2007.

* cited by examiner

*Primary Examiner* — Neveen Abel Jalil
*Assistant Examiner* — Tyler Torgrimson
(74) *Attorney, Agent, or Firm* — Tutunjian & Bitetto, P.C.; Eustus D. Nelson

(57) ABSTRACT

A method of holding information for identifying a cause for an object becoming problematic and presenting the information to a user. The method ascertains the cause of memory consumption by a program in a computer system. This method includes: acquiring a first call path related to the creation of an object from a memory; acquiring a second call path related to the connection to the object from the memory; and determining a common part of the acquired first and second call paths, wherein the common part indicates the cause in the program.

15 Claims, 20 Drawing Sheets

| STUCK FACTOR | CREATION CONTEXT ID | CONNECTION CONTEXT ID | OBJECT ID |
|---|---|---|---|
| a( )→b( ) | 1234 | 5678 | 0xCD5678 |
| | 1234 | 5678 | 0xCD0394 |
| | 1234 | 9876 | 0xCD4585 |
| a( ) | 1234 | 8765 | 0xCD4333 |
| a( )→x( ) | 4567 | 8765 | 0xCD9853 |
| | 4567 | 8765 | 0xCD9323 |
| a( )→x( )→y( ) | 4567 | 4321 | 0xCD2443 |
| p( )→q( ) | 2468 | 4680 | 0xCD3567 |

METHOD OF ASCERTAINING PRIMARY CAUSE OF MEMORY CONSUMPTION IN PROGRAM, AND COMPUTER SYSTEM AND COMPUTER PROGRAM FOR THE SAME

CROSS REFERENCE TO RELATED APPLICATION

This application claims priority under 35 U.S.C. 119 from Japanese Patent Application 2009-130756, filed May 29, 2009, the entire contents of which are incorporated herein by reference.

BACKGROUND OF THE INVENTION

1. Field of the Invention

The present invention relates to a method of ascertaining the cause of memory consumption in a program, and a computer system and computer program for the same.

2. Description of Related Art

In order to tune up the performance of a program, a user may get an execution profile of memory consumption by this program. In this case, the user may often want to identify what in the program causes certain memory consumption. This is because if the cause can be identified, it will be easy for the user to focus on the limited part of the original program logic as the cause of the memory consumption in order to alter it for reducing the memory consumption that poses a performance problem.

When the user employs a conventional execution profile technique using a profiler, for example, it is easy to trace down a method, which has come to create an object whose memory consumption would be problematic at a certain point during program execution, and source methods that called the method directly or indirectly, which end up with the root (very beginning) method call. For example, in the case of Java™, the user uses a profiler called hprof that comes with Java™ 2 SE 6.0 to record an object ID in a location where the object is created in the program and a method call stack up to the location. The record enables the user to get the ID of the object likely to be problematic and the call stack of methods up to the creation of the object.

However, in the above conventional execution profile technique, the user cannot understand why the problematic object stays in the memory during program execution and how the object has become problematic. In other words, the user cannot derive, from the record, what caused the object to become problematic, at least partly because the user has registered the object in a table likely to continue to stay in the memory.

In a technique disclosed in Japanese Application Publication No. 2008-134709, a request ID on an object created during processing the request to a server and a method call stack up to the creation are recorded. When there is an object staying in a memory as long as the request processing is completed, the object is suspected of causing a memory leak. The object is presented together with the method call stack recorded up to the creation of the object.

Bond, M. D., McKinley, K. S., "Probabilistic Calling Context," in Proceedings of OOPSLA 2007, the 22nd Annual ACM SIGPLAN Conference on Object-Oriented Programming, Systems, Languages, and Applications, Montreal, Quebec, Canada, pp. 97-112, Oct. 21-25, 2007 teaches a technique called probabilistic calling context (PCC). PCC is known as a technique for holding down the overhead at the time of execution profile acquisition to a small percentage. PCC aims at verifying that two calling contexts are identical with a high probability.

In the conventional execution profile technique, the user cannot understand why the object whose memory consumption is problematic at a certain point during program execution stays in the memory during program execution and how the object has become problematic. Therefore, it is desired to have a method of holding information for identifying why the object has become problematic and presenting the information to the user.

SUMMARY OF THE INVENTION

The present invention provides a method of ascertaining the cause of memory consumption in a program in a computer system. In accordance with one aspect of the present invention, a computer system performs the steps of: acquiring at least one of a first call path related to creation of an object from a memory and a first ID corresponding to the first call path; acquiring at least one of a second call path related to connection to the object from the memory and a second ID corresponding to the second call path; and determining a common part of the first and second call paths. The common part indicates the cause of memory consumption by the program.

In accordance with another aspect of the present a computer system ascertains a cause of memory consumption by a program in the system by performing the steps of: storing, in a memory, (i) a first ID corresponding to a first call path related to the creation of an object and/or (ii) the first call path, the storing step occurring when the program is executed to cause execution of code to create the object; and storing, in the memory, (i) a second ID corresponding to a second call path related to a connection to the object and/or (ii) the second call path, the storing step occurring when the program is executed to cause execution of code to connect the object in the program. A common part of the first call path corresponding to the first ID and the second call path corresponding to the second ID indicates the cause of memory consumption by the program.

In accordance with a further aspect of the present invention, a computer system is configured to ascertain a cause of memory consumption by a program. The system includes: an acquisition section for acquiring, from a memory, a first call path related to creation of an object and a second call path related to connection to the object; and a calculation section for calculating a common part of the acquired first and second call paths. The common part indicates the cause of memory consumption by the program.

BRIEF DESCRIPTION OF THE DRAWINGS

FIG. 1E shows an example of a stuck factor table used in FIG. 1C in the embodiment of the present invention.

DETAILED DESCRIPTION OF PREFERRED EMBODIMENTS

Figure 1A:
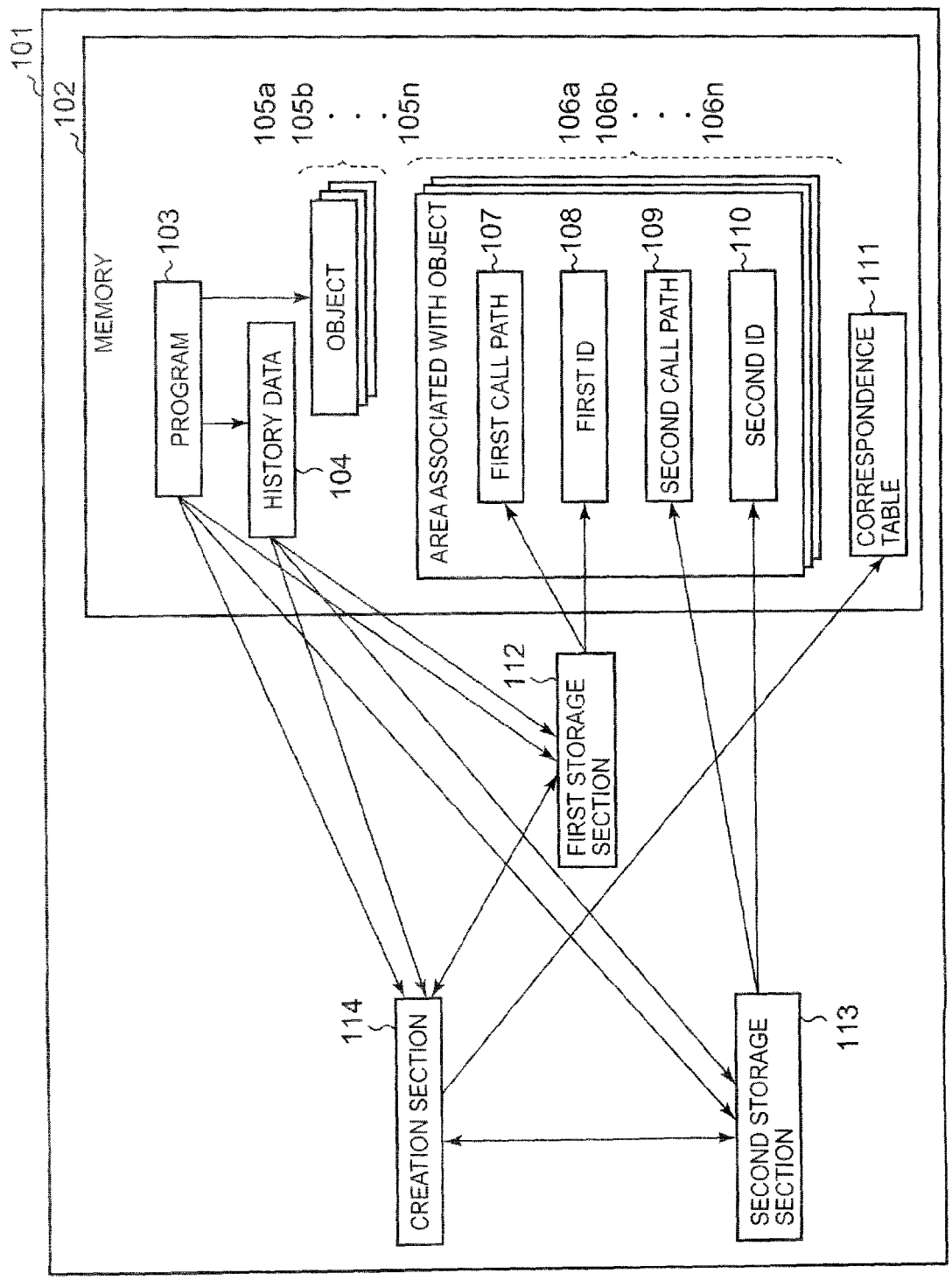
FIG. 1A is a functional block diagram showing an example of the functions of a system for storing, in a memory, information for presenting a situation of memory consumption by a program in the embodiment of the present invention.

In a preferred embodiment of the present invention, "program" is a program created in a programming language capable of handling objects. The program is executed in a processing system for allocating each object to a memory area accessible to the object. The accessible memory area is, but not limited to, a heap memory. For example, the program includes an object-oriented language. The program can be created by, but not limited to, Java™, C#, C++, or Ruby. Further, the processing system is, but not limited to, a Java™ virtual machine (JVM) or a Microsoft®.NET Framework.

In the embodiment of the present invention, "object" is data having a data structure capable of holding a reference relationship between data. The data is, but not limited to, an object in an array, a structure, and an object-oriented language. The object is allocated in an accessible memory area. The object is implemented as a target for an abstracted procedure on the program. The target for the abstracted procedure on the program is, but not limited to, a class. The implementation is to prepare a data area corresponding to the class, for example. The object is allocated to a memory area at the time of program execution. The memory area allocated at the time of program execution may be the same as or different from the accessible memory area, which is, but not limited to, the heap memory.

In the embodiment of the present invention, "object creation" means to prepare a data area corresponding to the object. The object creation means a process to allocate the object to the memory area.

The object creation is written by, but not limited to, new expression and newInstance method calls in Java™ source code. The object creation is executed by, but not limited to, a new operation in a Java™ byte code.

In the embodiment of the present invention, "connection to the object" means that object X is referenced by another object Y. For example, the connection to the object is a process to store, in object X, information pointing to object Y or store, in object Y, information pointing to object X. The information pointing to an object is, but not limited to, a pointer pointing to a memory area to which the object is allocated. Here, the storage destination may be the memory area to which each object is allocated, or a memory area with which the object is associated.

The connection to the object is made by, but not limited to, writing in Java™ source code that a method or variable included in object X is passed to object Y. For example, the connection to the object is made by, but not limited to, putfield, putstatic, or aastore operation in a Java™ byte code.

In the embodiment of the present invention, "object is active" means that the object is valid at a certain point during program execution. If an object is used at the certain point during program execution, the object can be active. In a general garbage collection (GC), active objects are determined to be distinct from garbage objects. The active objects are object determined to be active in the determination. On the other hand, the garbage objects are objects determined not to be active objects in the determination.

In the embodiment of the present invention, "call path" means information on hierarchical calling relationship in the program. The call path represents a flow of calls invoked up to the execution of a process focused on in the program.

The call may also referred to as subroutine, method, and calling. The call path may also be referred to as context or calling context.

Suppose that in a program, a second method is called in a first method and third method and fourth method are called in the second method. Suppose further that a first process is executed in the third method and a second process is executed in the fourth method.

In this program example, a call path when focusing on the first process (hereinafter call path A) is "first method→second method→third method→first process." A call path when focusing on the second process (hereinafter call path B) is "first method→second method→fourth method→second process."

"Common part of call paths" means a part common to call paths. For example, the common part of call path A and call path B is any of "first method→second method," and "first method," and "second method."

The "latest call included in the common part" means a call executed most recently. For example, the latest call included in the common part of call path A and call path B is "second method."

In the embodiment of the present invention, "ID corresponding to a call path" is a value associated with the call path. The call path is identified from the ID corresponding to the call path. For example, this identification is done by referring to a correspondence table listing combinations of IDs corresponding to call paths and the call paths. The ID corresponding to each call path is, but not limited to, a PCC ID to be described later.

In the embodiment of the present invention, "program analysis result" means the result of analyzing the program by paying attention to calls.

The embodiment of the present invention will now be described with reference to the accompanying drawings. It should be understood that the embodiment is to illustrate a preferred form of the present invention and is not intended to limit the scope of the present invention. Throughout the following drawings, the same reference numeral denotes the same target unless otherwise indicated.

FIG. 1A is a functional block diagram showing an example of the functions of a system for storing, in a memory, information for presenting a situation of memory consumption by a program in the embodiment of the present invention.

A computer system 101 includes a storage (not shown), a first storage section 112, a second storage section 113, and a creation section 114.

For example, the storage (not shown) is a memory 102 or an auxiliary memory device.

The memory 102 is a main memory device having a memory area freely available to applications. In the memory area, a program 103, history data 104, and at least one object 105a, 105b, . . . , 105n can be stored. In the memory area, areas 106a, 106b, . . . , 106n associated with objects are provided. A correspondence table 111 may also be stored in the memory area.

Part of the memory area may be a memory area of an auxiliary memory device different from the memory 102. The auxiliary memory device is, but not limited to, a hard disk drive or a solid-state drive.

The program 103 is a target program whose memory consumption situation is to be monitored. The program 103 includes a process to create objects and a process to connect objects. The program 103 is read by the computer system 101 into the memory 102, and executed by a central processing unit (CPU).

The history data 104 is data including the history of subroutines called, the history of execution of the process to create objects, and the history of execution of the process to connect objects in the program 103. The history data 104 is stored in the memory 102 at the time of execution of the program 103. The history data 104 may be stored in the storage (not shown) as a log file.

The objects 105a, 105b, . . . , 105n are data allocated to the memory 102 for each process to create an object. The objects 105a, 105b, . . . , 105n can be deallocated from the memory by a process to deallocate each object or by garbage collection.

The areas 106a, 106b, . . . , 106n associated with the objects are memory areas in which information on call paths related to the objects are stored, respectively. The areas 106a, 106b, . . . , 106n associated with the objects are allocated to the memory area for each of the objects 105a, 105b, . . . , 105n. Each of the areas 106a, 106b, . . . , 106n associated with the objects may be part of an area to which each of the objects 105a, 105b, . . . , 105n is allocated. In the areas 106a, 106b, . . . , 106n associated with the objects, a first call path 107, a first ID 108, a second call path 109, and a second ID 110 can be stored, respectively.

The first call path 107 is information representing a flow of calls up to the execution of code to create an object in the program 103. The information can be included in the program 103 or the history data 104.

The first ID 108 is an ID corresponding to the first call path 107 in a one-to-one relationship. This ID is, but not limited to, a PCC ID created by using PCC.

The second call path 109 is information representing a flow of calls up to the execution of code to allow an object 105a to connect or be connected to another object 105b in the program 103. The information can be included in the history data 104 or written in the program 103.

The second ID 110 is an ID corresponding to the second call path 109 in a one-to-one relationship. This ID is, but not limited to, a PCC ID.

The correspondence table 111 shows correspondences between call paths and IDs. The correspondence table 111 includes combinations of call paths and IDs corresponding to the call paths. The correspondence table 111 may be created by the user, left as the history data 104 during execution of the program 103, or created by executing any logic to execute the program 103. The logic may be logic to determine, from a call path, the PCC ID corresponding to the call path. For example, the creation section 114 executes the logic. The correspondence table 111 may be stored in the storage (not shown) as a text file, for example.

The first storage section 112 acquires an ID from the creation section 114 in response to the execution of code to create an object in the program 103. The first storage section 112 stores the acquired ID as the first ID 108 in a corresponding area 106a, 106b, . . . , 106n associated with the object. Instead of or in addition to acquiring the ID, the first storage section 112 may acquire a call path from the program 103 or the history data 104. The first storage section 112 may store the acquired call path as the first call path 107 in a corresponding area 106a, 106b, . . . , 106n associated with the object.

Here, if the areas 106a, 106b, 106n associated with the objects are included in the objects 105a, 105b, . . . , 105n, respectively, at least one of the first call path 107 and the first ID 108 is stored in, but not limited to, the object header of each object 105a, 105b, . . . , 105n.

The second storage section 113 acquires an ID from the creation section 114 in response to the execution of code to connect objects in the program 103. The second storage section 113 stores the acquired ID as the second ID 110 in at least one of an area associated with another object connected to the object or the area associated with the object (hereinafter, referred to as "area related to the connection"). For example, when the object 105a is connected to the object 105b, the second storage section 113 stores the acquired ID as the second ID 110 in at least one of the area 106a associated with the object 105a or the area 106b associated with the object 105b. Instead of or in addition to acquiring the ID, the second storage section 113 may acquire a call path from the program 103 or the history data 104. The second storage section 113 may store the acquired call path as the second call path 109 in the area related to the connection.

Here, in the example in which the object 105a is connected to the object 105b, if the area 106a associated with the object is included in the object 105a and the area 106b associated with the object is included in the object 105b, at least one of the second call path 109 or the second ID 110 is stored in, but not limited to, the object header of the object 105a or the field header of the object 105b.

The creation section 114 acquires a call path from the program 103 or the history data 104 to create an ID corresponding to the call path. The creation section 114 may create the ID using any logic for the program 103 or the history data 104. The logic may be logic using PCC, for example. The creation section 114 may store a combination of the acquired call path and the created ID in the correspondence table 111. The creation section 114 sends the created ID to the first storage section 112 or the second storage section 113 in response to a request from the first storage section 112 or the second storage section 113.

Figure 1B:
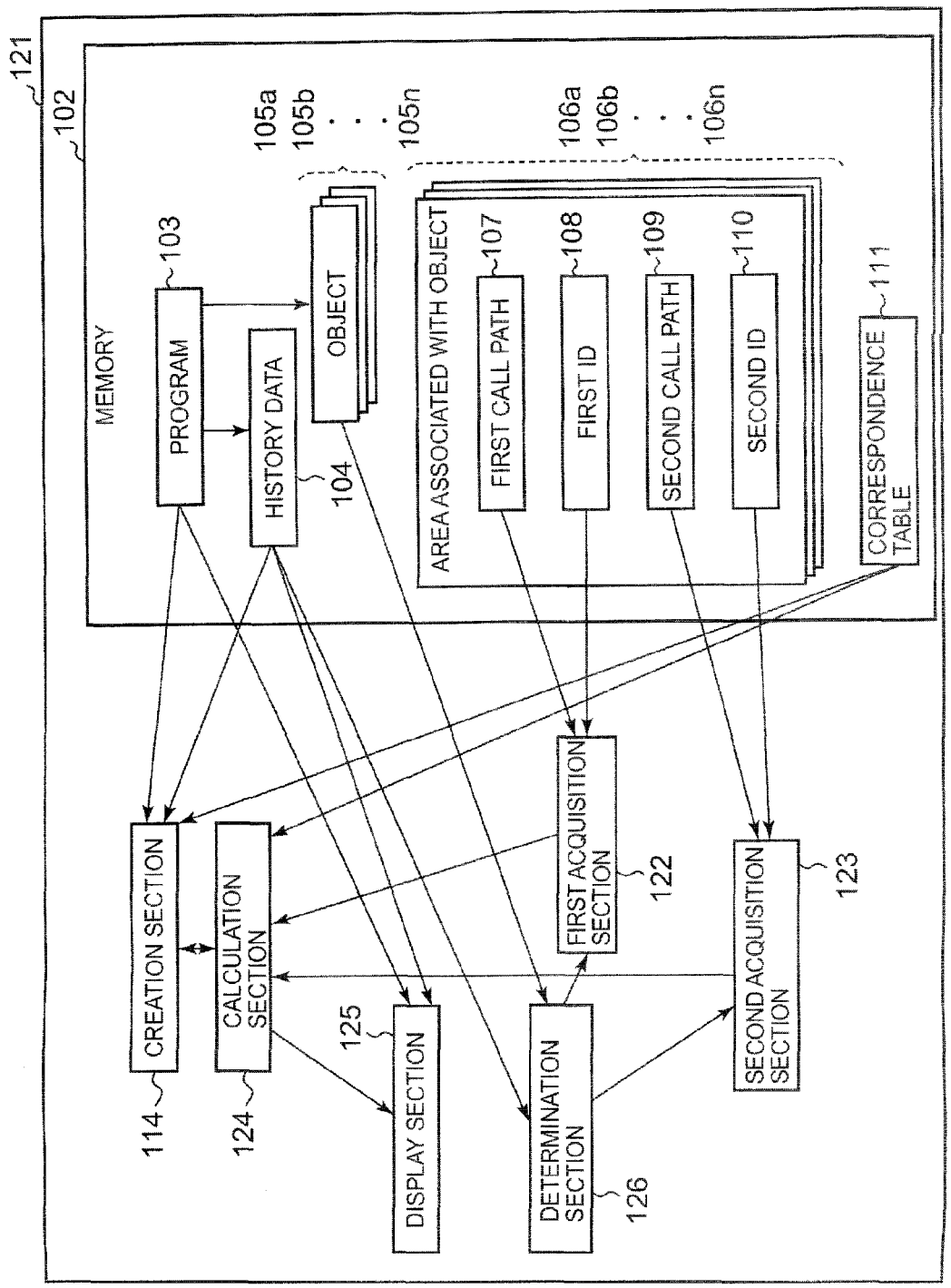
FIG. 1B is a functional block diagram showing an example of the functions of a system for presenting the situation of memory consumption by the program in the embodiment of the present invention.

FIG. 1B is a functional block diagram showing an example of the functions of a system for presenting the situation of memory consumption by the program in the embodiment of the present invention.

A computer system 121 includes the memory 102, a first acquisition section 122, a second acquisition section 123, the creation section 114, a calculation section 124, a display section 125, and a determination section 126.

The computer system 121 is a computer system including the same functions as the computer system (101 in FIG. 1A) described with reference to FIG. 1A, or a computer system sharing the computer system (101 in FIG. 1A) and the memory 102 or capable of holding the same data included in the memory 102 by copying the data or the like. The memory 102 and the creation section 114 are the same as those described with reference to FIG. 1A.

The processes executed by the computer system 121 are executed in parallel to the processes executed by the computer system 101 or after completion of the processes executed by the computer system 101.

The first acquisition section 122 acquires at least one of the first call path 107 and the first ID 108 (hereinafter, referred to as information on the first call path) from each of the areas 106a, 106b, . . . , 106n associated with the objects. Then, the first acquisition section 122 sends the information on the acquired first call path to the calculation section 124. This acquisition may be done for only active objects notified from the determination section 126.

The second acquisition section 123 acquires at least one of the second call path 109 and the second ID 110 (hereinafter, referred to as information on the second call path) from each of the areas 106a, 106b, . . . , 106n associated with the objects. Then, the second acquisition section 123 sends the information on the acquired second call path to the calculation section 124. This acquisition may be done for only active objects notified from the determination section 126.

When the first ID 108 is included in the information on the sent first call path, the calculation section 124 converts the first ID 108 to the first call path 107. Further, when the second ID 110 is included in the information on the second call path, the calculation section 124 converts the second ID 110 to the second call path 109. The calculation section 124 retrieves the call path paired with the first ID 108 and the call path paired with the second ID 110 from the correspondence table 111 to perform the conversions. As another example of the conversion, the calculation section 124 may cause the creation section 114 to create an ID. When the created ID matches the first ID 108 or the second ID 110, the calculation section 124 sets the source call path as the first call path 107 or the second call path 109 to perform the conversion.

Next, the calculation section 124 calculates the common part of the first call path 107 or the converted first call path 107 included in the information on the first call path and the second call path 109 or the converted second call path 109 included in the information on the second call path. The calculation section 124 sends the calculated common part to the display section 125. The calculation section 124 may also send at least one of the first call path 107 and the second call path 109 to the display section 125.

The display section 125 displays the sent common part or the latest call included in the common part on the monitor or the like as the cause of memory consumption in the program 103. For example, using the first call path 107 to be sent from the calculation section 124, the second call path 109 to be sent from the calculation section 124, and information included in at least one of the program 103 and the history data 104, the display section 125 can provide a user interface to identify the cause of memory consumption. When objects are shown on the user interface, the display section 125 can display object B referenced from only one object A in such a manner to combine object B with object A.

The determination section 126 references the history data 104 or the objects 105a, 105b, . . . , 105n to determine an active object. The determination section 126 notifies the determined active object to the first acquisition section 122 and the second acquisition section 123.

Upon receipt of the notification, the first acquisition section 122 and the second acquisition section 123 can acquire information on the first call path and information on the second call path related to the active object.

Figure 1C:
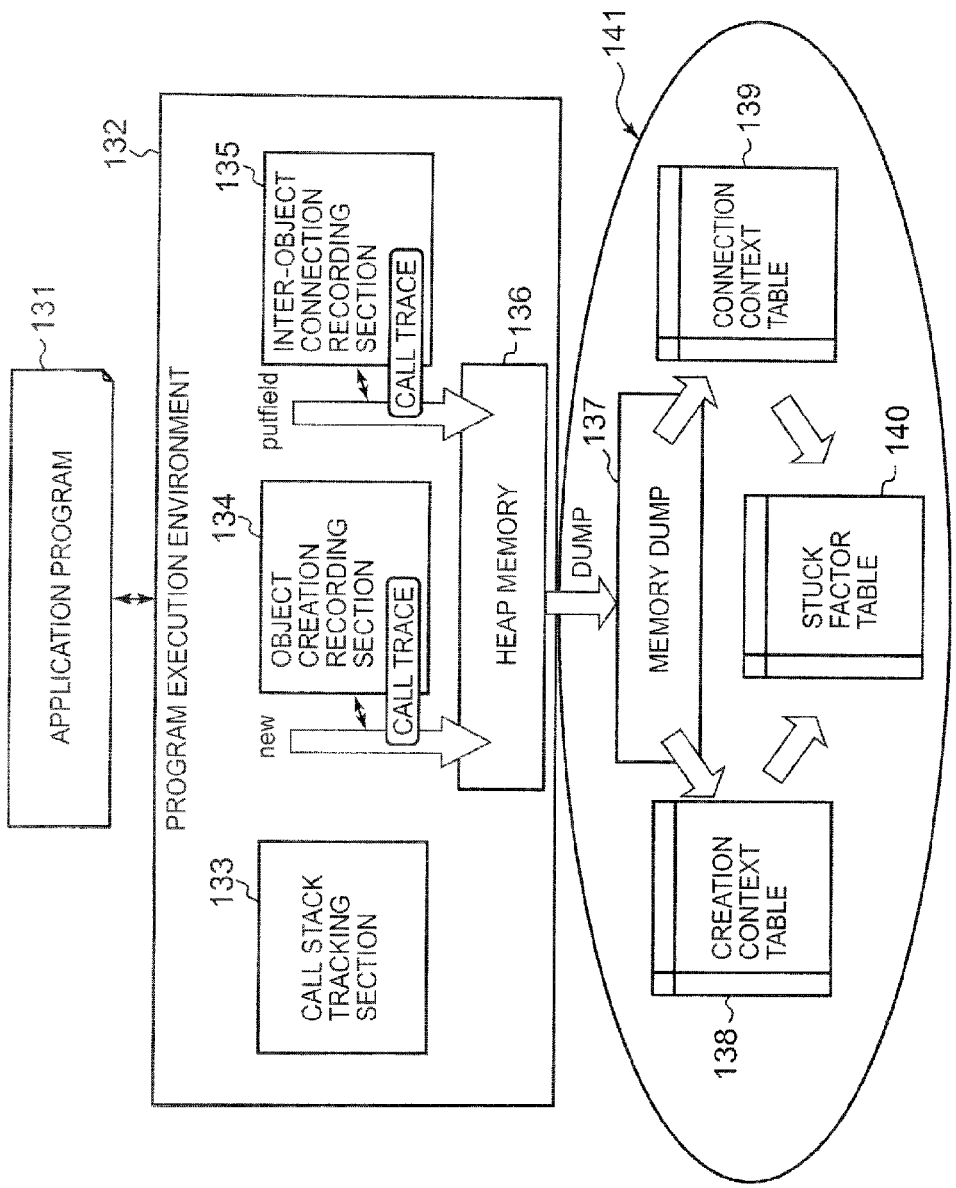
FIG. 1C is a block diagram when the system shown in FIG. 1A is configured on a Java™ program execution system in the embodiment of the present invention.

FIG. 1C is a block diagram when the system shown in FIG. 1A is configured on a Java™ program execution system in the embodiment of the present invention. The area enclosed by an ellipse 141 in FIG. 1C corresponds to the processes in the system shown in FIG. 1B. The details of the area enclosed by the ellipse 141 in FIG. 1C will be described later with reference to FIG. 1D and FIG. 1E.

In the block diagram, in addition to the conventional Java™ program execution system, components for acquiring an execution profile and tables obtained by the components are added. The components are a call stack tracking section 133, an object creation recording section 134, and an inter-object connection recording section 135. The tables are a creation context table 138, a stuck factor table 140, and a connection context table 139.

An application program 131 is a program checked for its memory consumption situation. For example, the application program 131 is Java™ byte code. The application program 131 corresponds to the program 103 in FIG. 1A.

A program execution environment 132 is an environment necessary for the computer system to execute the application program 131. For example, the program execution environment 132 is JVM (Java™ Virtual Machine). The program execution environment 101 corresponds to the computer system 101 in FIG. 1A.

A heap memory 136 is a memory area allocated to the application program 131. For example, objects created by the application program 131 are recorded in the heap memory 136. The heap memory 136 corresponds to the memory 102 in FIG. 1A. The objects to be recorded correspond to the objects 105a to 105n in FIG. 1A.

The call stack tracking section 133 is a component for enabling the object creation recording section 134 and the inter-object connection recording section 135 to record call stacks at high speed. Here, cal stack recording corresponds to the history data 104 in FIG. 1A. The call stack tracking section 133 corresponds to the creation section 114 in FIG. 1A. The call stack tracking section 133 creates an ID corresponding to a calling context (call path) (hereinafter, calling context ID) expressing the process of method calling using a probabilistic calling context (PCC) technique, for example. This creation is done by performing method calling on the application program 131.

The following describes a procedure in which the call stack tracking section 133 creates a calling context ID using PCC.

Step 1: The call stack tracking section 133 puts an ID on each method whenever the method is implemented. This ID may be the beginning address of calling code of the method in the memory. If the address is set as the ID, the ID is automatically assigned without the need for special assignation processing.

Step 2: The call stack tracking section 133 initializes, to zero, a variable (hereinafter C) used as the calling context ID.

Step 3: The call stack tracking section 133 preserves the value C by pushing it on the stack or the like each time the method calling is performed on the application program 131. The call stack tracking section 133 also calculates a new C (hereinafter Cn) value using an old C (hereinafter Co) value. For example, if the ID assigned to a method on which the method calling is performed each time the method is implemented is expressed as M, Cn is expressed as "Cn=3*Co+M."

Thus, the calling context ID is created through step 1 to step 3.

Here, as a variation of the implementation of a calling context (call path), a position in the code where an object, e.g., a JVM program counter, is created may be included in a calling context (first call path) at the time of object creation. The type of the object may also be included in the calling context (first call path) at the time of object creation. The inclusion of the program counter or the object type slightly increases the overhead of object creation at the time of program execution, whereas this makes it easy for the program to use the calling context (call path). At least one of the program counter and the object type may be included in a calling context (second call path) at the time of connection between objects. For example, in an example in which the program counter is included in the calling context (call path), the ID assigned to each method implementation in PCC can be set as an ID assigned to each program counter to make a distinction of method callings located at multiple positions in the program.

The object creation recording section 134 hooks the execution of an object creation process on the application program 131. This object creation process is a new operation, for example. In response to hooking, the object creation recording section 134 acquires a calling context ID from the call stack tracking section 133. The object creation recording section 134 embeds the acquired calling context ID in the object header of an object created by the hooked object creation process. The object creation recording section 134 corresponds to the first storage section 112 in FIG. 1A.

The inter-object connection recording section 135 hooks the execution of an inter-object connection process on the application program 131. The inter-object connection process is a putfield, putstatic, or aastore operation. In response to hooking, the inter-object connection recording section 135 acquires a calling context ID from the call stack tracking section 133. The inter-object connection recording section 135 embeds the acquired calling context ID in the object header of an object as the destination connected by the hooked object connection process or the field header of an object as the connection source. The inter-object connection recording section 135 corresponds to the second storage section 113 in FIG. 1A.

The call stack tracking section 133 may not be included in this configuration. Even when the call stack tracking section 133 is not included, the computer system can trace a call stack (history data) in response to hooking the object creation process or the inter-object connection process to create a calling context (call path). In the case, however, the implementation cost of the application program 131 increases compared to the case where the computer system includes the call stack tracking section 133.

Figure 1D:
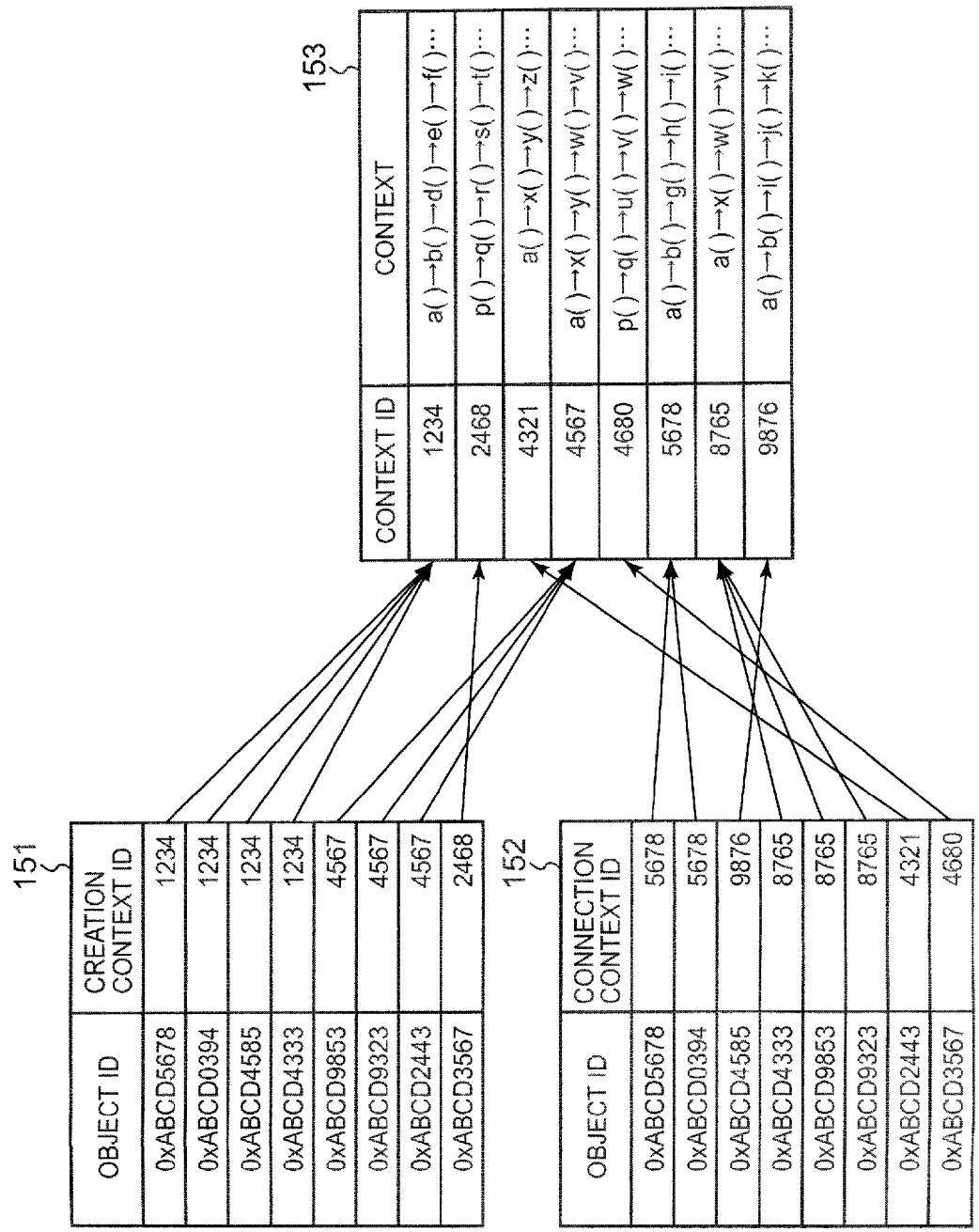
FIG. 1D shows an example of a creation context table and a connection context table shown in FIG. 1C in the embodiment of the present invention.

FIG. 1D shows an example of the creation context table and the connection context table shown in FIG. 1C in the embodiment of the present invention.

A creation context table 151 and a connection context table 152 are created from a memory dump 137 where the content of the heap memory 136 has been dumped. Here, the memory dump 137 is where the states of the objects 105a to 105n and the execution state of the program 103 in FIG. 1B have been dumped.

The creation context table 151 is a table in which a combination of data capable of identifying each object (hereinafter, object ID) and the first ID corresponding to the context (first call path) up to the object creation (hereinafter, creation context ID) is stored. Alternatively, a combination of the object ID and the first call path may be stored in the creation context table 151. The object ID is, but not limited to, an address of the object on the memory. The creation context ID is, but not limited to, a PCC ID in PCC.

The connection context table 152 is a table in which a combination of the object ID and the second ID corresponding to a context (second call path) up to the object connection (hereinafter, connection context ID) is stored. The connection context ID is, but not limited to, a PCC ID in PCC. Alternatively, a combination of the object ID and the second call path may be stored in the creation context table 151.

The correspondence table 153 is a table in which a combination of the creation context ID, the connection context ID (hereinafter, context ID), and the context (call path) are stored. The context (call path) is data from which a relationship between subroutine callings can be found. For example, a context (call path) "a( )→b( )→d( )→e( )→f( )" as the first record in the correspondence table 153 shows data describing such a relationship that a subroutine b( ) is called in a subroutine a( ) a subroutine d( ) is called in the subroutine b( ) and so on. The correspondence table 153 is used to determine the context (call path) corresponding to the creation context ID or the connection context ID. For example, in the creation context table 151, the creation context ID corresponding to objects whose object IDs are "0xABCD5678," "0xABCD0394," "0xABCD4585," and "0xABCD4333," respectively, is all "1234." In this case, the context (call path) corresponding to the context ID "1234" in the correspondence table 153 is "a( )→b( )→d( )→e( )→f( )." Thus, it can be determined that all the four objects are objects all created in the context "a( )→b( )→d( )→e( )→f( )." The context (call path) may be used intact as the creation context ID and the connection context ID. When the context (call path) is used intact, the computer system (121 in FIG. 1B) does not need the correspondence table 153. The correspondence table 153 corresponds to the correspondence table 111 in FIG. 1B.

FIG. 1E shows an example of the stuck factor table used in FIG. 1C in the embodiment of the present invention.

A stuck factor table 161 is a table in which a combination of each object ID and a stuck factor of the object are stored. The creation context ID and the connection context ID may also be included in the stuck factor table 161.

The stuck factor is a context (call path) of a common part from the top-level subroutine between the context (first call path) up to the object creation and the context (second call path) up to the object connection. The stuck factor can be determined from the creation context table 151, the connection context table 152, and the correspondence table 153. For example, in the case of an object whose object ID is "0xCD5678," creation context ID "1234" is determined from the creation context table 151 and connection context ID "5678" is determined from the connection context table 152. Next, a context (call path) "a( )→b( )→d( )→e( )→f( )" corresponding to the creation context ID "1234" and a context (call path) "a( )→b( )→( )→h( )→i( )" corresponding to the connection context ID "5678" are determined from the correspondence table 153. Then, "a( )→b( )" as the context (call path) of the common part from the top-level subroutine between the context (call path) "a( )→b( )→d( )→e( )→f( )" and the context (call path) "a( )→b( )→g( )→h( )→i( )" is determined. Thus, the stuck factor "a( )→b( )" corresponding to object ID "0xCD5678" can be determined.

Figure 1F:
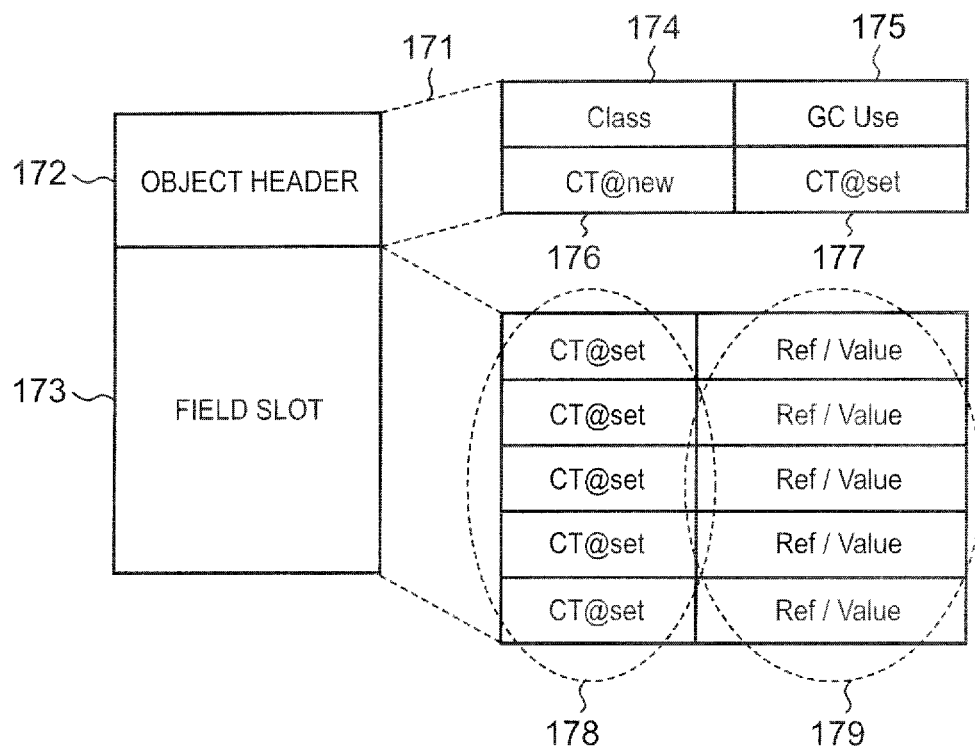
FIG. 1F shows an example of the structure of an object on a heap memory used in FIG. 1C in the embodiment of the present invention.

FIG. 1F shows an example of the structure of an object on the heap memory used in FIG. 1C in the embodiment of the present invention.

This object corresponds to one of the objects 105a, 105b, . . . , 105n in FIG. 1A and FIG. 1B. It is assumed that the object includes a corresponding one of the areas 106a, 106b, . . . , 106n associated with the objects.

An object 171 has an object header 172 and a field slot 173.

In the object header 172, information 174 on class, indicative of the object type or the like, and information 175 on garbage collection can be stored. The calling context ID can also be embedded in the object header 172.

The field slot 173 is further divided into a field header 178 and a field body 179. The calling context ID can be embedded in the field header 178. A pointer to another object referenced by the object 171 or a value to be managed in the field body 179 can be stored in the field body 179.

An area 176 in which the calling context ID is embedded at the time of object creation is referred to as a CT@new portion (hereinafter, also referred to as creation context ID header), and an area 177 or 178 in which the calling context ID is embedded at the time of inter-object connection is referred to as a CT@set portion (hereinafter, also referred to as connection header). Although the area 177 on the object header and the area 178 on the field header are provided as the areas in which the calling context ID is embedded at the time of inter-object connection, the calling context ID has only to be embedded in either one of the areas upon implementation of the embodiment of the present invention. In the implementation in which the calling context ID is embedded in the area 177 on the object header, the computer system embeds the calling context ID in the area 177 on the object header of the destination object at the time of inter-object connection. The destination object means an object as the destination referenced from the field. In the implementation in which the calling context ID is embedded in the area 178 on the field header, the computer system embeds the calling context ID in the area 178 on the field header of the source object at the time of inter-object connection. Note that FIG. 2 and figures that follow take, as an example, a case where the implementation with the calling context ID embedded in the area 178 on the field header is employed.

Figure 2:
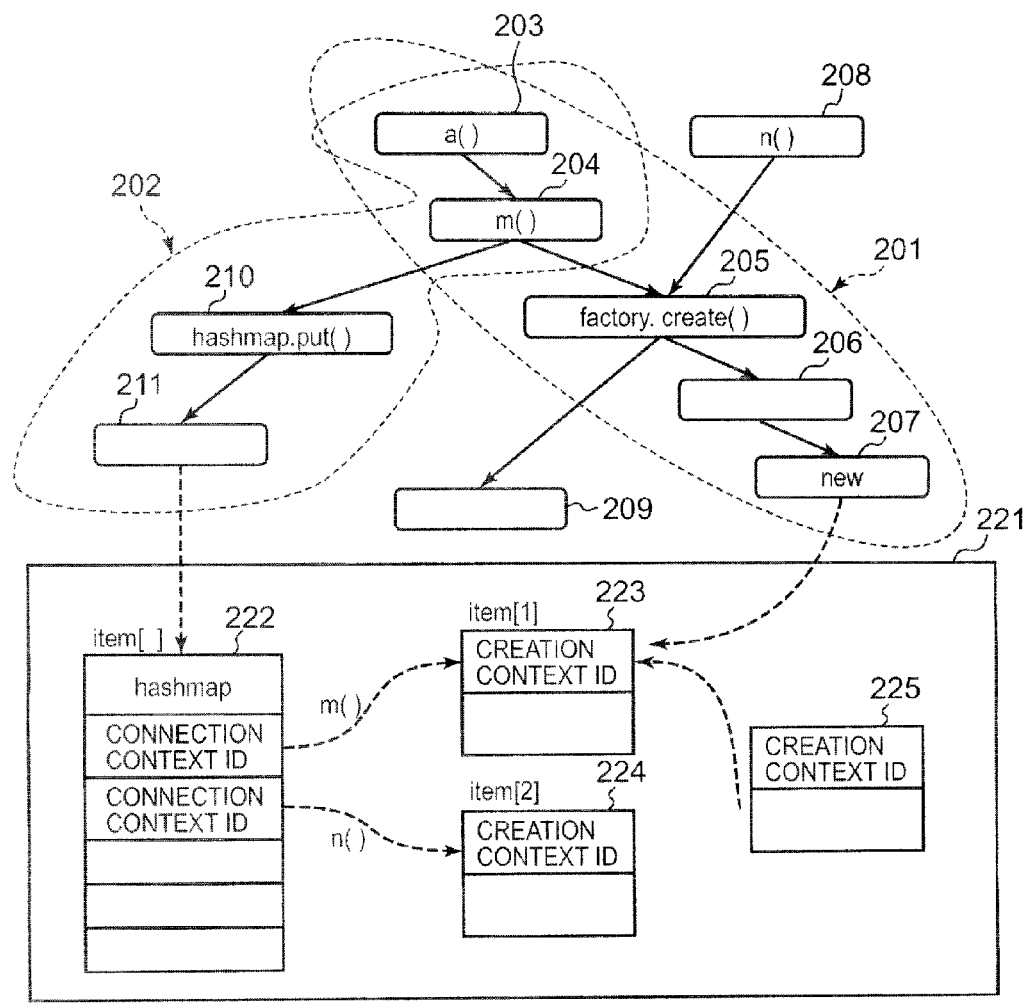
FIG. 2 is a diagram for describing the outline of processing performed in the system shown in FIG. 1A and FIG. 1B in the embodiment of the present invention.

FIG. 2 is a diagram for describing the outline of processes executed on the system shown in FIG. 1A and FIG. 1B in the embodiment of the present invention.

Note that FIG. 2 and figures that follow take, as an example, a case where the program 103 is written in Java™ language. Here, methods in Java™ language correspond to calls.

FIG. 2 depicts methods or operations 203 to 211 and objects 222 to 225 on a memory 221 using implementation method m( ) 204 as "void m( ){Object o=factory.create( ) hashmap.put (key,o);}" as an example. Note that the method m( ) is a method called in top-level method a( ) 203.

The method m( ) 204 includes two method calls: factory.create( ) 205 and hashmap.put( ) 210. The two methods are versatile methods, which can be called from any method such as method n( ) 208 other than the method m( ) 204.

factory.create( ) 205 is a method having the function of creating an object in the implementation. Therefore, a process to create the object, e.g., a new operation 207 can be included in calls of the methods or operations 206, 207, and 209 included in the factory.create( ) 205.

hashmap.put( ) 210 is a method having the function of setting a value to a hash map. Therefore, an operation to connect another object to a hash map object can be included in the method or operation 211 included in the hashmap.put( ).

The object 222 represents the hash map. Another object 223 is connected to the object 222 by the method or operation 211. The connection context ID about the object 223 is embedded into the object 222 at the time of connection. Further, though not shown, when a call to the hashmap.put( ) 210 is included in the method n( ) 208 and an object 224 created by a new operation (not shown) included in the method n( ) is connected to the object 222, the connection context ID about the object 224 is embedded in the object 222 at the time of connection.

An object 223 indicates an object created by a new operation 207. Upon creation, a creation context ID is embedded in the object 223.

A creation context ID 201 indicates a flow of calls up to the creation of an object 223 created in factory.create( ) 205.

A connection context 202 indicates a flow of calls up to the connection of the object 223 to the object 222.

According to the embodiment of the present invention, the cause of an object stuck in the memory is narrowed down more than the conventional technique. Here, in the conventional technique, the cause is determined by using only the calling context up to object creation (hereinafter, creation context ID). In contrast, in the embodiment of the present invention, a flow of calls up to the object connected to another object is also used in addition to the creation context ID.

The following description is made on condition that the object 223 is the stuck object.

In the conventional technique, the cause is determined by using only the creation context ID 201. Based on the determination on the cause, the computer system can present the methods 203 to 206 as methods that could potentially be the causes of memory consumption.

In contract, in the embodiment of the present invention, the connection context 202 is also used in addition to the creation context ID 201 to determine the cause. Based on the determination on the cause, the computer system can present the methods 203 and 204 in a range, in which the creation context ID 201 intersects the connection context 202, as methods that could potentially be the causes of memory consumption.

In the presentation by the conventional technique, the user cannot narrow down the cause of memory consumption because the versatile method, factory.create( ) 205, is presented, for example.

In contrast, in the presentation according to the embodiment of the present invention, the factory.create( ) 205 is excluded from the methods that could be the causes of memory consumption. In the presentation according to the embodiment of the present invention, the method m( ) 204 last called in the intersecting range and farthest from the root method a( ) 203 can be presented as a method much more likely to be the cause of memory consumption. This enables the user to narrow down the cause of memory consumption to the method m( ) 204 that calls the hashmap.put( ) 210.

The outline of processes shown in FIG. 2 consists of the "execution profile acquisition" step executed by the system shown in FIG. 1A and the "memory consumption factor display" step executed by the system shown in FIG. 1B.

In the execution profile acquisition step, the computer system leaves, in the memory, execution profile information indicating that objects have been created and connected. In the execution profile acquisition step, the following two kinds of information are left in the memory as the execution profile information.

First information: The calling context (first call path) up to the execution of code to create each object or the ID (first ID) corresponding to the context Second information: The calling context (second call path) up to the substitution of an object into a field variable or the like of another object or the ID (second ID) corresponding to the context The details of the process to leave the first information in the memory and the details of the process to leave the second information in the memory will be described later with reference to FIG. 3A and FIG. 3B, respectively.

In the memory consumption factor display step, the computer system determines, from the left execution profile information, the factor of memory consumption in an execution state at the time of program execution. Then, the computer system shows the factor on the display section by any method.

The factor can be determined for an object included in a snapshot of the memory in an execution state of the program. The computer system presents, to the user, the context of the common part that follows the top-level subroutine between the context represented by the first information and the context represented by the second information, as the locus of responsibility of the object for memory consumption.

The outline of the process to determine the factor will be described later with reference to FIG. 4, and the details of the process will be described later with reference to FIG. 5A to FIG. 5C, respectively.

In the execution profile acquisition step, since the processes to leave the first information and the second information in the memory are added, the overhead of the program by the execution profile acquisition step increases. Therefore, a method well-known as PCC may be applied to the embodiment of the present invention to implement the embodiment of the present invention in order to hold down the overhead to a small percentage.

When PCC is applied, a PCC ID is left in the memory as the first information in the execution profile acquisition step. Further, in the memory consumption factor display step, the correspondence table is created to recover the calling context (call path) from the PCC ID. Thus, from the correspondence table, the calling context (first call path) up to the execution of code to create the object and the calling context (second call path) up to the substitution of the object into the field variable or the like of another object are recovered.

The details of the process to crate the correspondence table will be described later with reference to FIG. 6A and FIG. 6B.

Figure 3A:
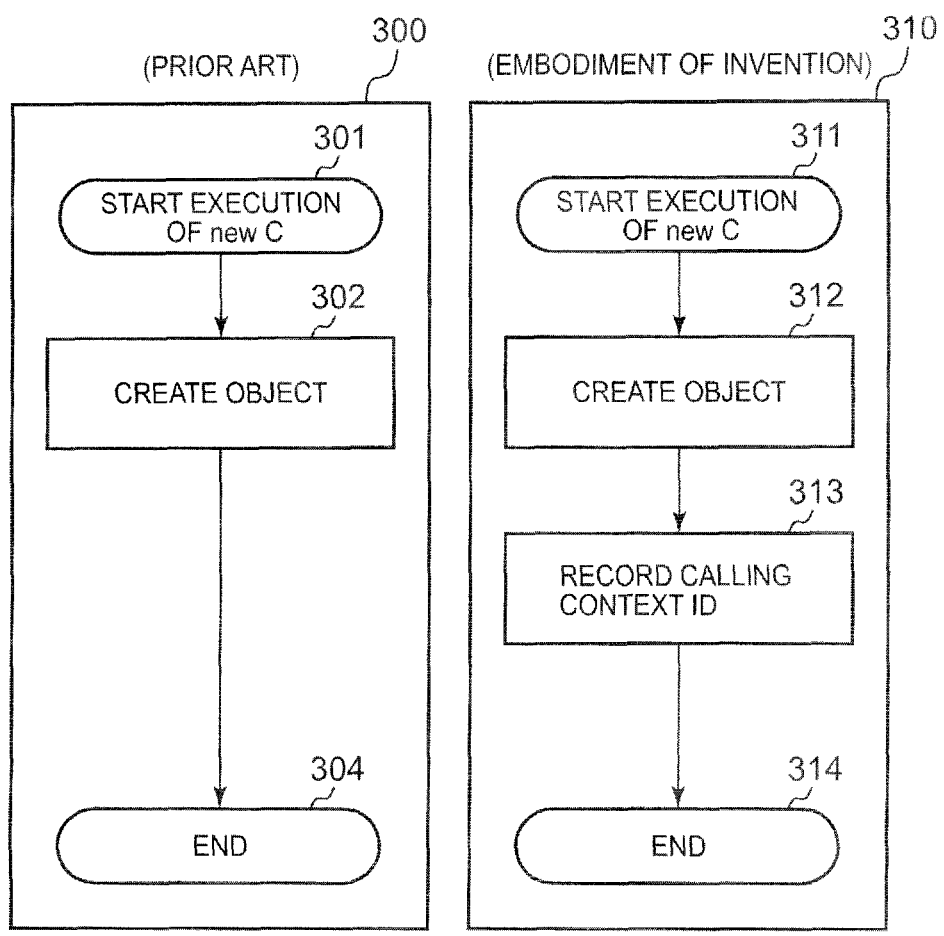
FIG. 3A contains an example of a flowchart in the embodiment of the present invention and an example of a flowchart in the conventional technique, showing a new operation to create an object shown in FIG. 1A.

FIG. 3A contains an example of a flowchart in the embodiment of the present invention and an example of a flowchart in the conventional technique, showing a new operation to create an object shown in FIG. 1A. In the embodiment of the present invention, the first information is left in the memory in the new operation.

Both a flowchart 300 and a flowchart 310 assume a case where "new C" is executed on Java™ byte code. The flowchart 300 is a flowchart on the new operation in the conventional technique. The flowchart 310 is a flowchart on the new operation in the embodiment of the present invention.

Respective processing steps in the flowchart 300 are as follows.

Step 301 represents the start of the new operation in the conventional technique.

In step 302, the computer system creates an instance object from class C.

Step 304 represents the end of the new operation in the conventional technique.

Respective processing steps in the flowchart 310 are as follows.

Step 311 represents the start of the new operation in the embodiment of the present invention.

In step 312, the computer system creates an instance object from class C.

In step 313, the computer system records the calling context ID (first ID) in the CT@new portion of the object header of the created object.

Step 314 represents the end of the new operation in the embodiment of the present invention.

In the flowchart 310, processing step 313 is added in addition to the processing steps of the flowchart 300.

Figure 3B:
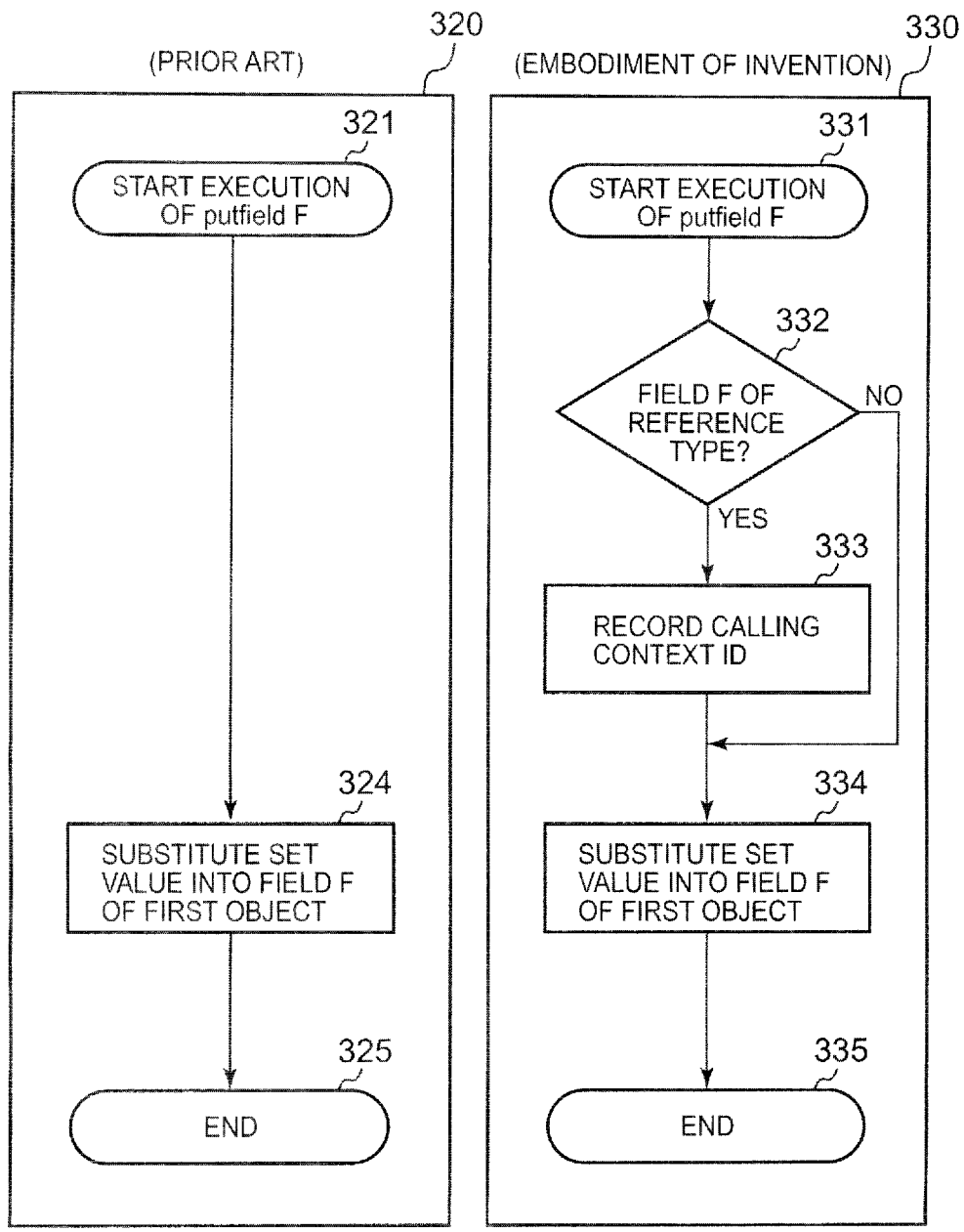
FIG. 3B contains an example of a flowchart in the embodiment of the present invention and an example of a flowchart in the conventional technique, showing a putfield operation to connect objects shown in FIG. 1A.

FIG. 3B contains an example of a flowchart in the embodiment of the present invention and an example of a flowchart in the conventional technique, showing a putfield operation to connect objects shown in FIG. 1A. For example, in the embodiment of the present invention, the second information is left in the memory in the putfield operation.

A flowchart 320 is a flowchart on the putfield operation in the conventional technique. A flowchart 330 is a flowchart on the putfield operation in the embodiment of the present invention. Both the flowchart 320 and the flowchart 330 assume a case where "putfield F" is executed on Java™ byte code. It is further assumed that the first object has field F and the second object has set value X.

Respective processing steps in the flowchart 320 are as follows.

Step 321 represents the start of the putfield operation in the conventional technique.

In step 324, the computer system substitutes the set value X for the second object into the field F of the first object.

Step 325 represents the end of the putfield operation in the conventional technique.

Respective steps in the flowchart 330 are as follows.

Step 331 represents the start of the putfield operation in the embodiment of the present invention.

In step 332, the computer system determines whether the field F of the first object is a reference-type field. Here, the reference-type field means a field that holds a value pointing to the object, e.g., a pointer to the object. The field other than the reference-type field means a field that holds an integer value, rather than the value pointing to the object. If the field F of the first object is the reference-type field, the processing proceeds to step 333. If it is not the reference-type field, the processing proceeds to step 334.

In step 333, the computer system records the calling context ID (second ID) in the CT@set portion of the field F of the first object or the CT@set portion of the object header of the second object. After completion of the recording, the processing proceeds to step 334.

In step 334, the computer system substitutes the set value X for the second object into the field F of the first object. After completion of the substitution, the processing proceeds to step 335.

Step 335 represents the end of the putfield operation in the embodiment of the present invention.

In the flowchart 330, processing steps 332 and 333 are added in addition to the processing steps of the flowchart 320.

Figure 4:
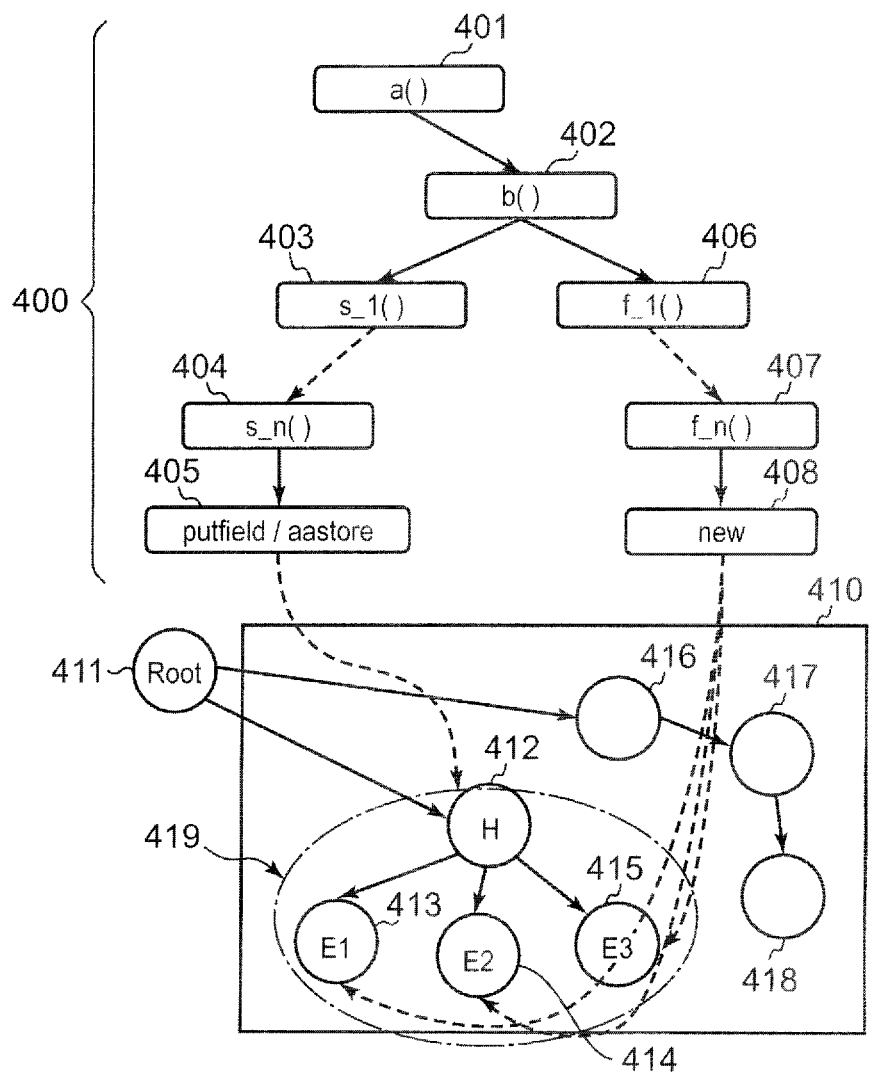
FIG. 4 is a diagram for describing a method of creating three tables shown in FIG. 1C in the embodiment of the present invention.

FIG. 4 is a diagram for describing a method of creating the three tables shown in FIG. 1C in the embodiment of the present invention.

A calling relationship diagram 400 schematically shows the state of program execution. Rectangles with rounded corners, 401 to 408, represent methods or operations. Arrows represent a parent-child relationship between methods or between a method and an operation. The parent-child relationship means a relationship where child method calling or execution of an operation is included in one of processes executed by a parent method.

In the calling relationship diagram 400, a flow of calls (connection context) up to the execution of a putfield or aastore operation 405 and a flow of calls (creation context) up to the execution of a new operation 408 are shown. The connection context is "a( )(401)→b( )(402)→s_1( )(403)→ . . . →s_n( )(404)." The creation context is "a( )(401)→b( )(402)→f_1( )(406)→ . . . →f_n( )(407)."

An object relationship diagram 410 represents the states of objects on the memory. Circles 411 to 418 represent the root or objects. Arrows represent connections between objects. For example, an object 417 is connected to another object 416. In this connection, the object 416 is the source object and the object 417 is the destination object. Objects without connection sources are connected to the root 411. The root represents, for example, an execution stack or class variable.

The arrows from the new operation 408 to respective objects E1 to E3 413 to 415 indicate that the new operation has correspondence relationships with the objects E1 to E3 413 to 415, respectively. The correspondence relationship means that a reference relationship is left in the header of each of the objects E1 to E3 413 to 415, for example.

The arrow from the putfield or aastore operation 405 to the object H 412 indicates that the object as the target of the putfield or aastore operation 405 is the object H 412.

The following illustrates an example of determining the cause of a stuck condition when the object E1 413 is stuck.

1. The computer system performs the same processing as general garbage collection on dumped objects 412 to 418. This processing distinguishes the objects 412 to 418 into garbage objects and active objects.

In the same processing as the garbage collection, the computer system marks all objects accessible from the root in the object relationship diagram 410 in which the root is an execution stack or a class variable, for example. Then, the computer system determines the marked objects to be active objects and objects without marking to be garbage objects.

2. In this determination, if the object E1 413 is an active object, the computer system acquires a calling context ID from both the CT@new portion of the object E1 413 and the CT@set portion of the field header of the object H 412 referencing the object E1. In this determination, if the object E1 413 is a garbage object, the computer system determines the object E1 413 not to be a stuck object, and ends the processing.

3. The computer system recovers an actual calling context (call path) from the acquired calling context ID. The computer system uses the acquired calling context ID to search the correspondence table so that the actual calling context (call path) can be recovered. As another example of the recovery, the computer system creates an ID corresponding to the calling context included in a program by the logic using PCC, for example. If the acquired calling context ID matches the created ID, the source calling context can be recovered as the actual calling context (call path).

The computer system recovers the calling context ID acquired from the CT@new portion of the object E1 413 to obtain a creation context ID "a( )→b( )→f_1( )→ . . . →f_n( )." Further, the computer system recovers the calling context ID acquired from the CT@set portion of the field header of the object H 412 to obtain a connection context "a( )→b( )→s_1( )→s_n( )."

4. The computer system extracts, from the creation context ID and the connection context, a common part "a( )→b( )" starting with a call from the top-level parent (hereinafter, the root). Then, the computer system determines the common part "a( )→b( )" to be the stuck factor of the object E1 413.

Figure 5A:
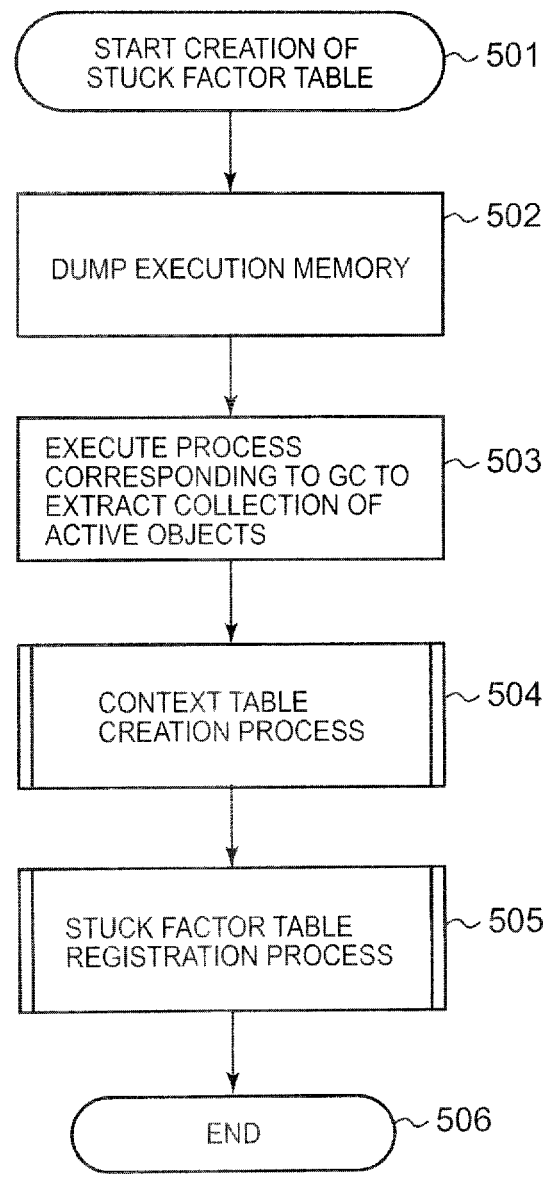
FIG. 5A is a flowchart of a process to create a stuck factor table shown in FIG. 1C in the embodiment of the present invention.

FIG. 5A shows an example of a flowchart of a process to create the stuck factor table used in FIG. 1C in the embodiment of the present invention.

Step 501 represents the start of the process to create the stuck factor table.

In step 502, the computer system dumps the execution memory. After completion of the dumping, the processing proceeds to step 503.

In step 503, the computer system execute a process, corresponding to the garbage collection, on the dumped memory (hereinafter, the dump memory). By this process, the computer system extracts a collection of active objects from the dump memory. After completion of the extraction, the processing exceeds to step 504.

In step 504, the computer system uses the extracted collection to create the creation context table and the connection context table (hereinafter, the context table). This creation process will be described later in detail with reference to FIG. 5B. After completion of the creation of the context table, the processing proceeds to step 505.

In step 505, the computer system determines a stuck factor from the created context table, and registers the determined stuck factor in the stuck factor table. This registration will be described later in detail with reference to FIG. 5C. After completion of the registration, the processing proceeds to step 506.

Step 506 represents the end of the process to create the stuck factor table.

The computer system displays the stuck factor table on the monitor or the like by any method. This display can present, to the user, methods that could be the causes of memory consumption.

Figure 5B:
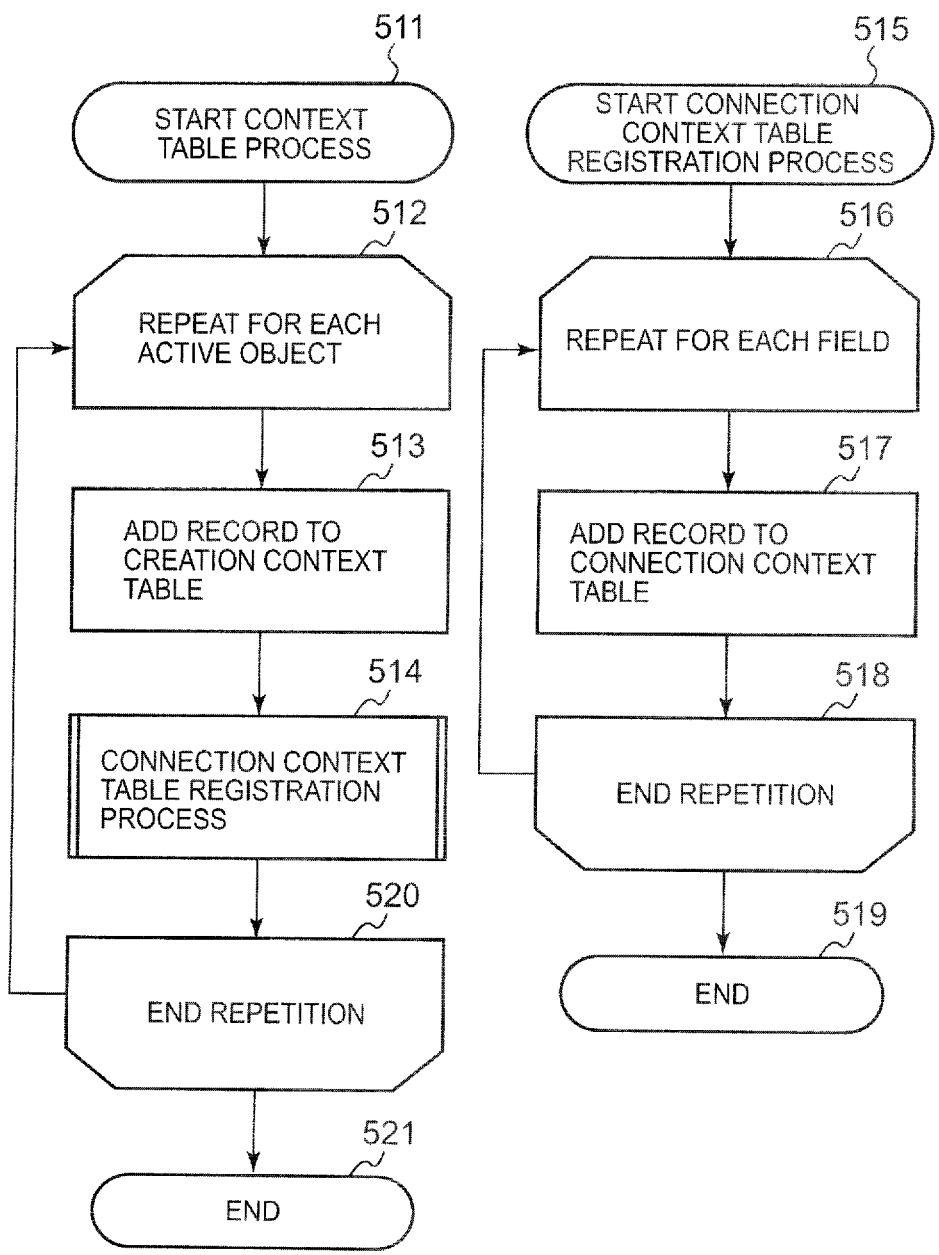
FIG. 5B shows an example of a detailed flowchart of processing step 504 in FIG. 5A in the embodiment of the present invention.

FIG. 5B shows an example of a detailed flowchart of processing step 504 in FIG. 5A in the embodiment of the present invention.

Step 511 represents the start of step 504 in FIG. 5A.

In step 512, the computer system extracts one of the active objects from the collection of active objects extracted in step 503. After completion of the extraction, the processing proceeds to step 513.

In step 513, the computer system acquires a calling context ID (creation context ID) from the CT@new portion of the object header of the extracted active object. Then, the computer system adds a combination of the acquired creation context ID and an ID (object ID) indicative of the active object to the creation context table. After completion of the addition to the creation context table, the processing proceeds to step 514.

Step 514 represents a process for registration in the connection context table. In this registration process, step 515 to step 519 are executed.

Step 515 represents the start of the registration of each object in the connection context table.

In step 516, the computer system selects one of fields in the active object extracted in step 512. After completion of the selection, the processing proceeds to step 517.

In step 517, the computer system acquires a calling context ID (connection context ID) from the CT@set portion of the field header of the selected field. Then, the computer system adds a combination of the acquired connection context ID and the object ID to the connection context table. After completion of the addition to the connection context table, the processing proceeds to step 518.

In step 518, the computer system determines whether any unselected field remains in the extracted active object. If an unselected field remains, the processing returns to step 516. If no unselected field remains, the processing proceeds to step 519.

Step 519 represents the end of the registration of each object in the connection context table. Subsequently, the processing proceeds to step 520.

In step 520, the computer system determines whether there is any unextracted active object. If there is an active object that is not extracted from the collection, the processing returns to step 512. If there is no active object that is not extracted from the collection, the processing proceeds to step 521.

Step 521 represents the end of step 504 in FIG. 5A.

Figure 5C:
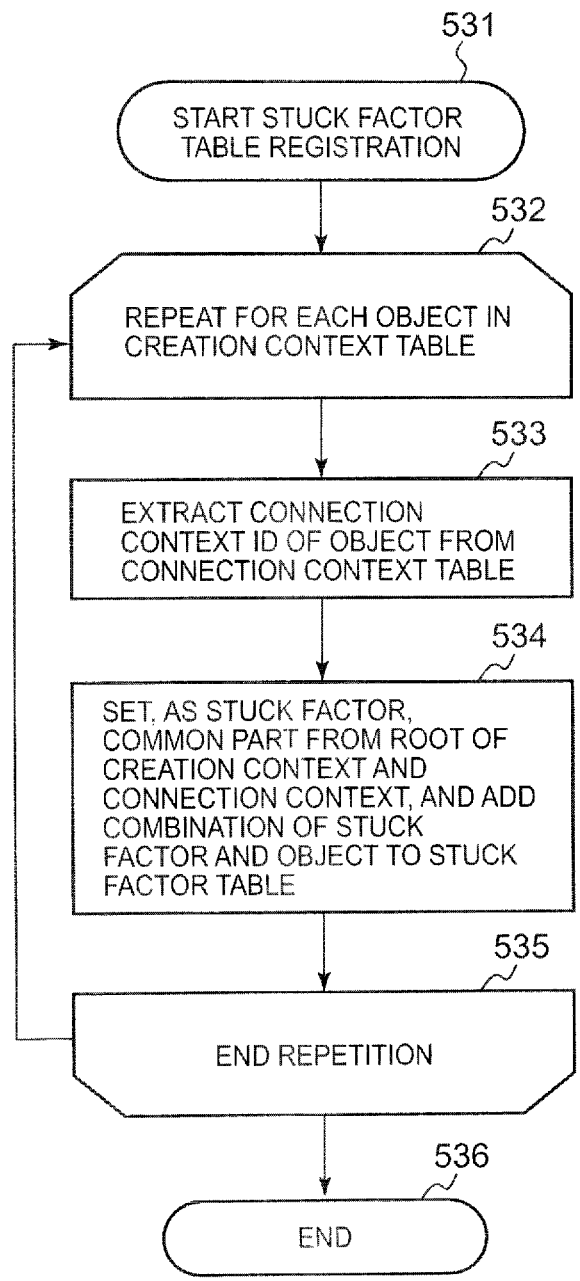
FIG. 5C shows an example of a detailed flowchart of processing step 505 in FIG. 5A in the embodiment of the present invention.

FIG. 5C shows an example of a detailed flowchart of processing step 505 in FIG. 5A in the embodiment of the present invention.

Step 531 represents the start of step 505 in FIG. 5A.

In step 532, the computer system extracts one combination of the creation context ID and the object ID from the creation context table. After completion of the extraction, the processing proceeds to step 533.

In step 533, the computer system extracts a connection context ID corresponding to the extracted object ID from the connection context table. After completion of the extraction, the processing proceeds to step 534.

In step 534, the computer system acquires, from the correspondence table, a creation context ID corresponding to the creation context ID extracted in step 532 and a connection context corresponding to the connection context ID extracted in step 533. Next, the computer system determines the common part (stuck factor) from the root of the creation context ID and the connection context. The computer system adds a combination of the stuck factor and the object ID to the stuck factor table. After completion of the addition, the processing proceeds to step 535.

In step 535, the computer system determines whether there is any combination that is not extracted from the creation context table. If there is a combination that is not extracted from the creation context table, the processing returns to step 532. If there is no combination that is not extracted from the creation context table, the processing proceeds to step 536 to end.

Step 536 represents the end of step 505 in FIG. 5A.

Figure 6A:
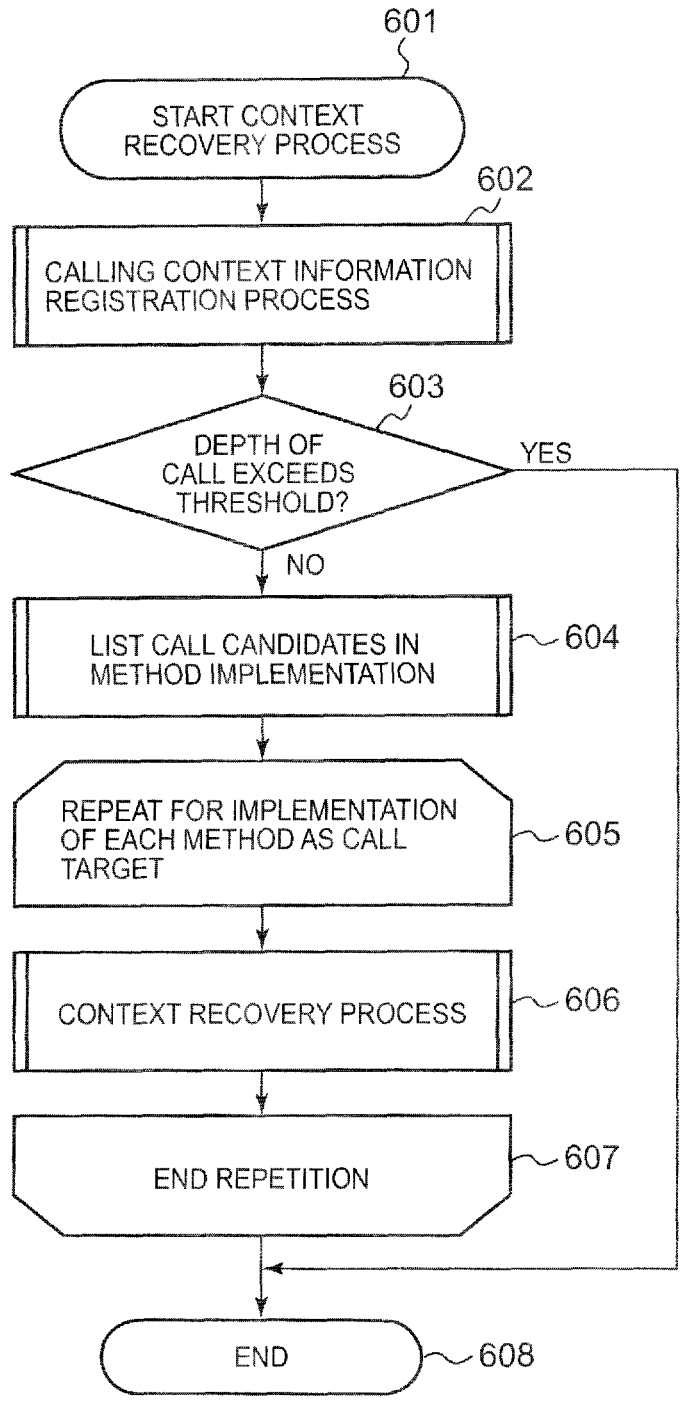
FIG. 6A shows an example of a flowchart for crating a correspondence table used in FIG. 1A in the embodiment of the present invention.

FIG. 6A shows an example of a flowchart for crating the correspondence table shown in FIG. 1A in the embodiment of the present invention.

In this flowchart processing, the computer system analyzes the program 103 in FIG. 1A and recalculates a calling context ID for each context (call path) configured in the program 103, respectively. Then, the computer system associates the context (call path) with the recalculated calling context ID and registers them in the correspondence table. Further, the computer system sets any unanalyzable context (call path) as a context (call path) the calling context ID of which is unknown.

The flowchart shown in FIG. 6A is performed on each target call. If another call is included during implementation of a call, the flowchart shown in FIG. 6A can be recursively performed by setting another call as the target call. In this recursive process, the call to which attention is paid first is set as the top-level call in the calls included in the program 103.

The correspondence table may be created at any timing as long as it is created before the factor of memory consumption is displayed.

Step 601 represents the start of a context recovery process.

In step 602, the context (call path) on the target call is registered in the correspondence table (calling context information table). The details of the registration will be described later in detail with reference to FIG. 6B. After completion of the registration, the processing proceeds to step 603.

In step 603, the computer system determines whether the depth of the target call exceeds a threshold. The depth of the target call means the position of the target call as viewed from the top-level call in a hierarchical calling relationship on the program 103. For example, if the depth of the top-level call (first layer call) is 1, the depth can be represented in such a manner that the depth of a call (second layer call) included in the implementation of the top-level call (in the implementation of the method) is 2, the depth of a call (third layer call) included in the implementation of the second layer call is 3, . . . , and the depth of a call (nth layer call) included in the implementation of the n−1th layer call (in the implementation of the method) is n.

The threshold is a value settable at user's discretion. The user sets the threshold to 5, for example.

In this determination, if the depth of the target call exceeds the threshold, the processing proceeds to step 608. If the depth of the target call does not exceed the threshold, the processing proceeds to step 604.

In step 604, the computer system extracts call candidates included in the implementation of the target call (implementation of the method). After completion of the extraction, the processing proceeds to step 605.

In step 605, the computer system extracts one of the extracted call candidates. After completion of the extraction, the processing proceeds to step 606.

In step 606, the computer system recursively executes the context recovery process by setting the extracted call candidate as the target call. After completion of the execution, the processing proceeds to step 607.

In step 607, the computer system determines whether there is any call candidate that is not extracted in step 605. If there is any unextracted call candidate, the processing returns to step 605. If there is no unextracted call candidate, the processing proceeds to step 608.

Step 608 represents the end of the context recovery process.

Figure 6B:
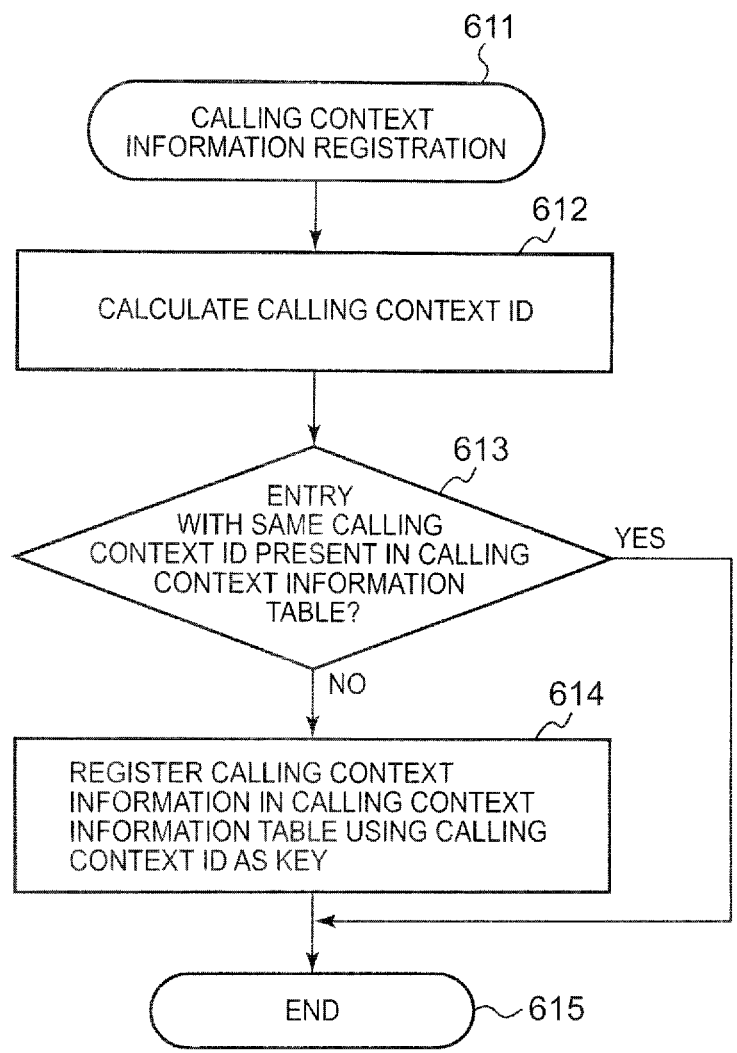
FIG. 6B shows an example of a detailed flowchart of processing step 602 in FIG. 6A in the embodiment of the present invention.

FIG. 6B shows an example of a detailed flowchart of processing step 602 in FIG. 6A in the embodiment of the present invention.

Step 611 represents the start of step 602 in FIG. 6A.

In step 612, the computer system calculates a calling context ID for the target call (call path). After completion of the calculation, the processing proceeds to step 613.

In step 613, the computer system determines whether there is an entry of the calculated calling context ID in the correspondence table. If there is the entry, the processing proceeds to step 615. If there is no entry, the processing proceeds to step 614.

In step 614, the computer system registers a combination of the calculated calling context ID and the context (call path) on the target call in the correspondence table. The calculated calling context ID is used as a key in searching the correspondence table. After completion of the registration, the processing proceeds to step 615.

Step 615 represents the end of the calling context information process. After that, the processing proceeds to step 603.

In the flowcharts of FIG. 6A and FIG. 6B, the combinations are registered in the correspondence table on a depth-priority basis. Here, the combinations may be registered on a width-priority basis, or may be combinations retrieved during a given time period. If they are registered on a width-priority basis, the computer system counts the number of calls on a layer basis in the flowcharts of FIG. 6A and FIG. 6B. Then, in step 603, if the count exceeds a given threshold, the processing proceeds to step 608. On the other hand, if the count does not exceed the given threshold, the processing proceeds to step 604.

Figure 7A:
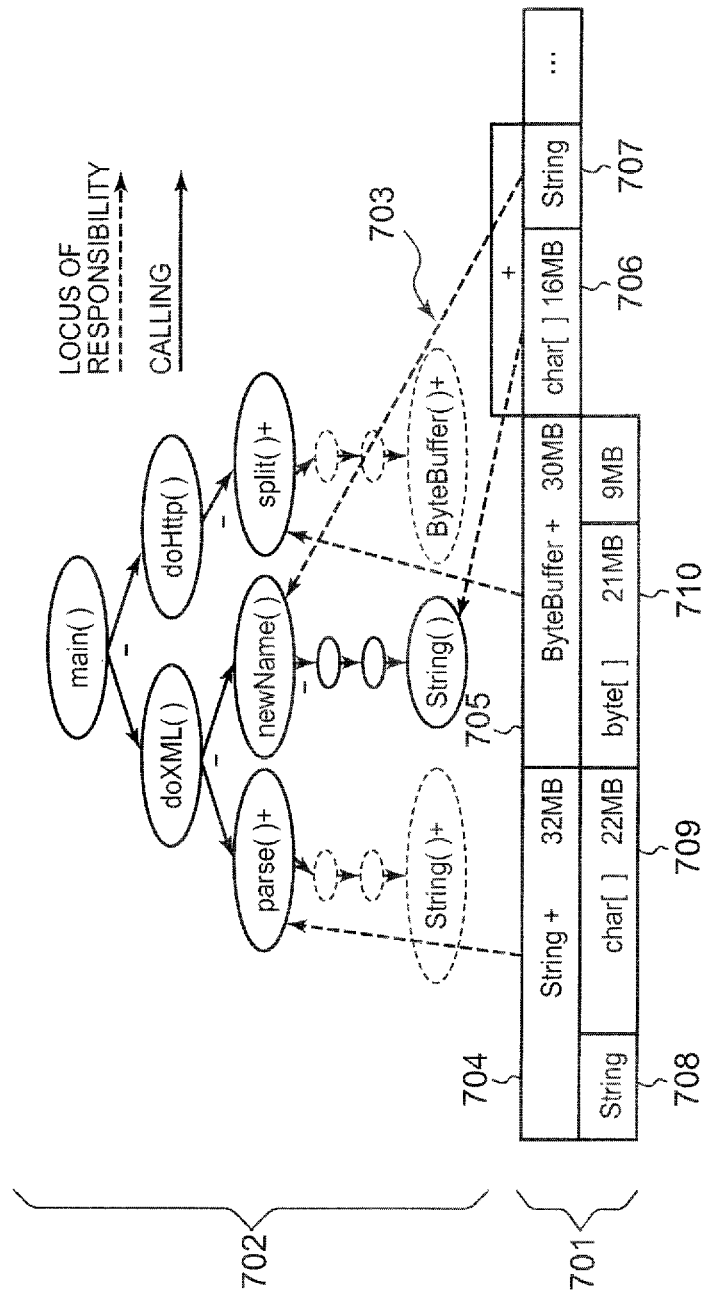
FIG. 7A shows a display example of a display section shown in FIG. 1B to indicate the cause of memory consumption in the embodiment of the present invention.

FIG. 7A shows a display example of the display section shown in FIG. 1B to indicate the cause of memory consumption in the embodiment of the present invention.

In the embodiment of the present invention, the computer system uses the stuck factor table (140 in FIG. 1C) and the memory dump (137 in FIG. 1C) to provide a display example having a layout shown in FIG. 7A, for example.

This display example includes a box 701 indicating an object group and a tree structure 702.

The box 701 represents a stuck object group due to the same stuck factor and of the same type. The transverse length of the box 701 corresponds to the capacity of the memory consumed by the objects. The stuck object group due to the same stuck factor and of the same type, and the capacity of the memory consumed can be obtained by sorting, by type, the object group united with the same stuck factor based on the stuck factor table. Further, if the position or the object type (hereinafter, additional information) in object creation code is stored in association with each object, the computer system can sort the object group using the additional information.

The tree structure 702 is to arrange calling contexts deduced to be the causes of the stuck object group in the form of a tree. The dashed arrow indicates the calling contexts deduced to be the causes of the consumption of a memory portion. For example, the dashed arrow 703 indicates a path through which a portion responsible for String object 707 reaches newName( ).

In the conventional technique without using inter-object connection, the possibility that a call below the newName( ), e.g., String( ), takes responsibility for object creation cannot be denied. Thus, in the display example according to the embodiment of the present invention, the causes of the stuck objects are narrowed down more than the display according to the conventional technique.

The common type of objects included in the box 701 and the common part of calls included in the tree structure 702 can be combined or divided automatically by the program logic or manually by the user. For example, the computer system may change how to show, to the user, the object group or the calling context in the display example based on information obtained from another program analysis or input from the user. For example, in the display example, an array object 709 included in String object 704 and String object 708 are displayed in the form of a compound based on information obtained from another program analysis. Further, in the display example, an array object 710 included in ByteBuffer object 705 is also displayed in the form of a compound.

In general, the computer system cannot automatically determine whether to combine. Therefore, the computer system may have the function of allowing the user to perform a combining operation. To provide the function, the computer system determines the possibility of a compound. The possibility of a compound can be determined from the reference relationship between objects. When a certain object A is referenced only from a single object B, the computer system determines that the object A and the object B can be combined as a compound.

In another simple method of allowing the combining operation, if all objects D referencing each object C in the same type of object group united with a stuck factor are united with the same stuck factor, the computer system considers a box including the same type of stuck object group due to the same stuck factor as a compoundable box. Further, the computer system may divide and display the box so that the box will become compoundable.

Figure 7B:
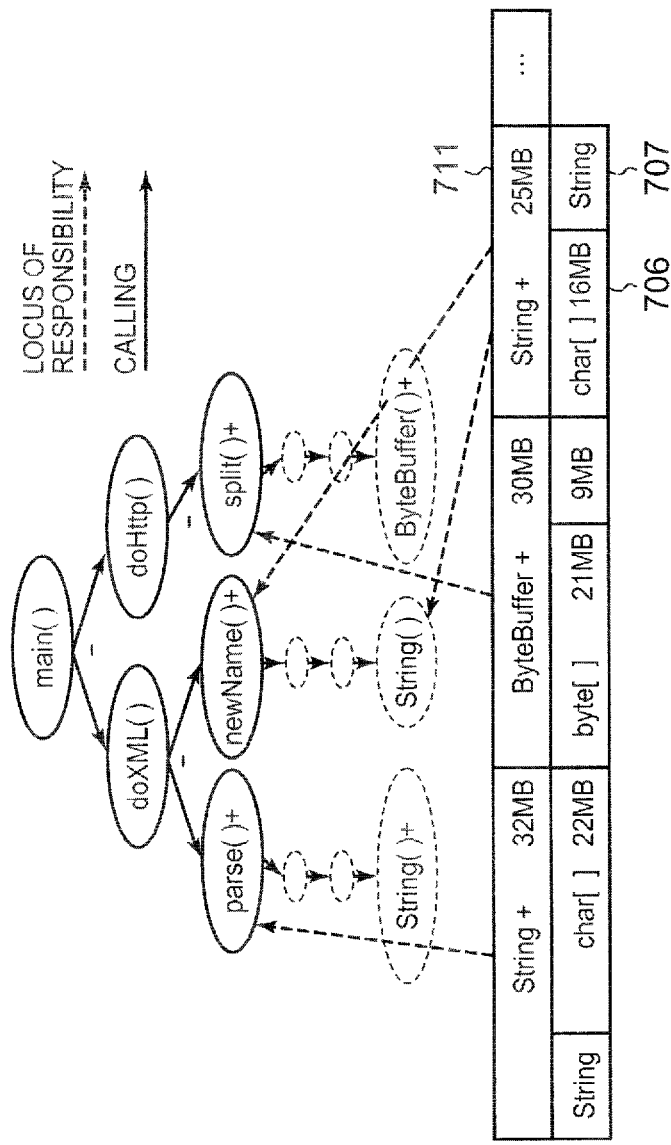
FIG. 7B shows an example when a user performs a combining operation on a box indicating an object group in the display example shown in FIG. 7A in the embodiment of the present invention.

FIG. 7B shows an example when the user performs the combining operation on a box indicating an object group in the display example used in FIG. 7A in the embodiment of the present invention.

In the display example shown in FIG. 7A, the user can display an array object 706 and String object 707 in the form of a compound by clicking on "+" displayed above the array object 706 and the String object 707, for example. As a result of the compound, String object 711 as a compound of the array object 706 and the String object 707 can be displayed.

Figure 7C:
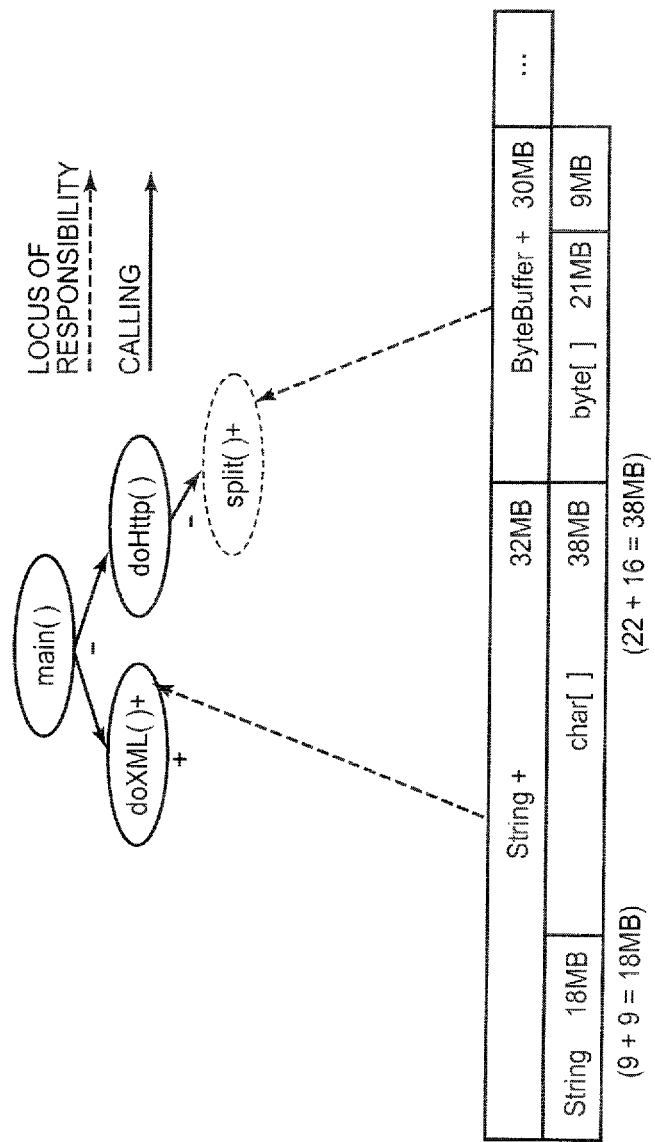
FIG. 7C shows an example when the user performs the combining operation on a calling context in the display example shown in FIG. 7A in the embodiment of the present invention.

FIG. 7C shows an example of the user performing the combining operation on a calling context.

The common part of calling contexts can be combined. In the display example shown in FIG. 7A, the computer system can display calls below the doXML( ) in the form of a compound by the user clicking on "-" displayed below the doXML( ). As a result of the compound, the lower calls on the tree structure 702 are hidden, for example. Further, the compound causes the box 701 to be reconstructed and displayed. In the display example of FIG. 7C, String object 704 and String object 705 are displayed in the form of a compound. Objects 708 to 710 respectively included in the String object 704 and the String object 705 are also displayed in the form of a compound.

The following illustrates an example of improving a program using a profiler in which the displays shown in FIG. 7A to FIG. 7C are implemented. Suppose first that the profiler provides the display in FIG. 7A on a monitor to show a state during the execution of the program.

1. The user sees the array object 706 and the String object 707 and comes to think that the array object 706 and the String object 707 should be handled in a mass based on his or her experience and knowledge. As a result, the user performs the combining operation and hence the display of FIG. 7B appears on the monitor.

2. The user checks a calling context pointed by the dashed arrow from the String object 711, and becomes aware that the stuck factor is main( )→doXML( )→newName( ). Therefore, the user is navigated by a tool, for example, to look into the definition of newName( ) of source code of the program.

3. The tool determines, from each method immediately after a common context of the creation context ID and the connection context, which combination of method calls in newName( ) is the cause of memory stuck, and presents the method call as the cause of the memory stuck to the user. Here, there can be two or more call portions for the same method like a case where the same method is called at different locations. If there are two or more call positions, the tool presents all the call positions.

4. Through the presentation, the user quickly finds that a cache being used is different from a cache that does not block GC to be used by the cache so that the source code can be altered.

Figure 7D:
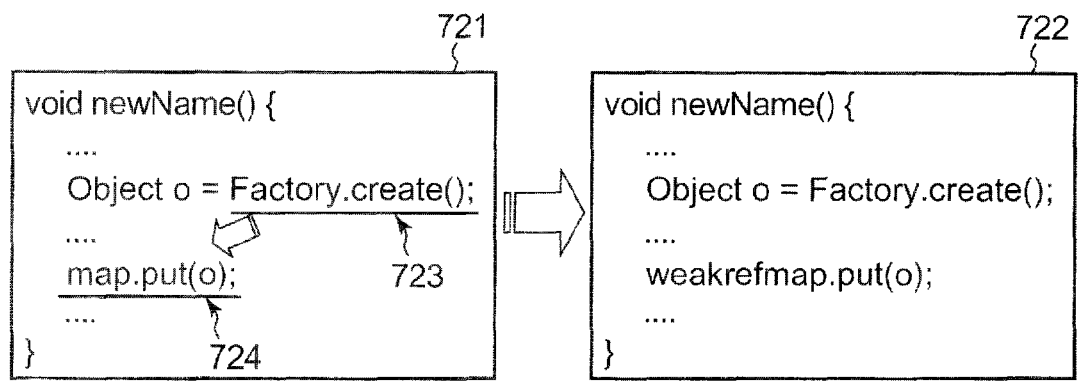
FIG. 7D shows an example of presenting the cause of a stuck condition in source code using a tool, and shows how the user alters the source code in the embodiment of the present invention.

FIG. 7D shows an example of presenting the cause of a stuck condition in the source code using the tool, and shows how the user alters the source code in the embodiment of the present invention.

The tool enables source code 721 to be displayed. In the display, object creation 723 and object connection 724 that could be the causes of memory stuck are highlighted by boldface and presented, for example. Through the presentation, the user finds that a first cache (map) being used is not a second cache (weakrefmap) that does not block GC to be used by the first cache.

The user alters a portion where the first cache (map) is used in the source code 721 into a portion where to use the second cache (weakrefmap).

As a result of the alternation, altered source code 722 can be obtained.

When a profiler without the implementation of the embodiment of the present invention is used, the user needs to go on and on checking called methods in order to determine Factory.create( ) 723 as object creation that could be the cause of memory detention. This makes it difficult for the user to identify the Factory.create( ) 723 in the source code 721.

However, since the source code 721 is presented in the embodiment of the present invention, the user can quickly guess the Factory.create( ) 723 as the cause of memory detention.

Figure 8:
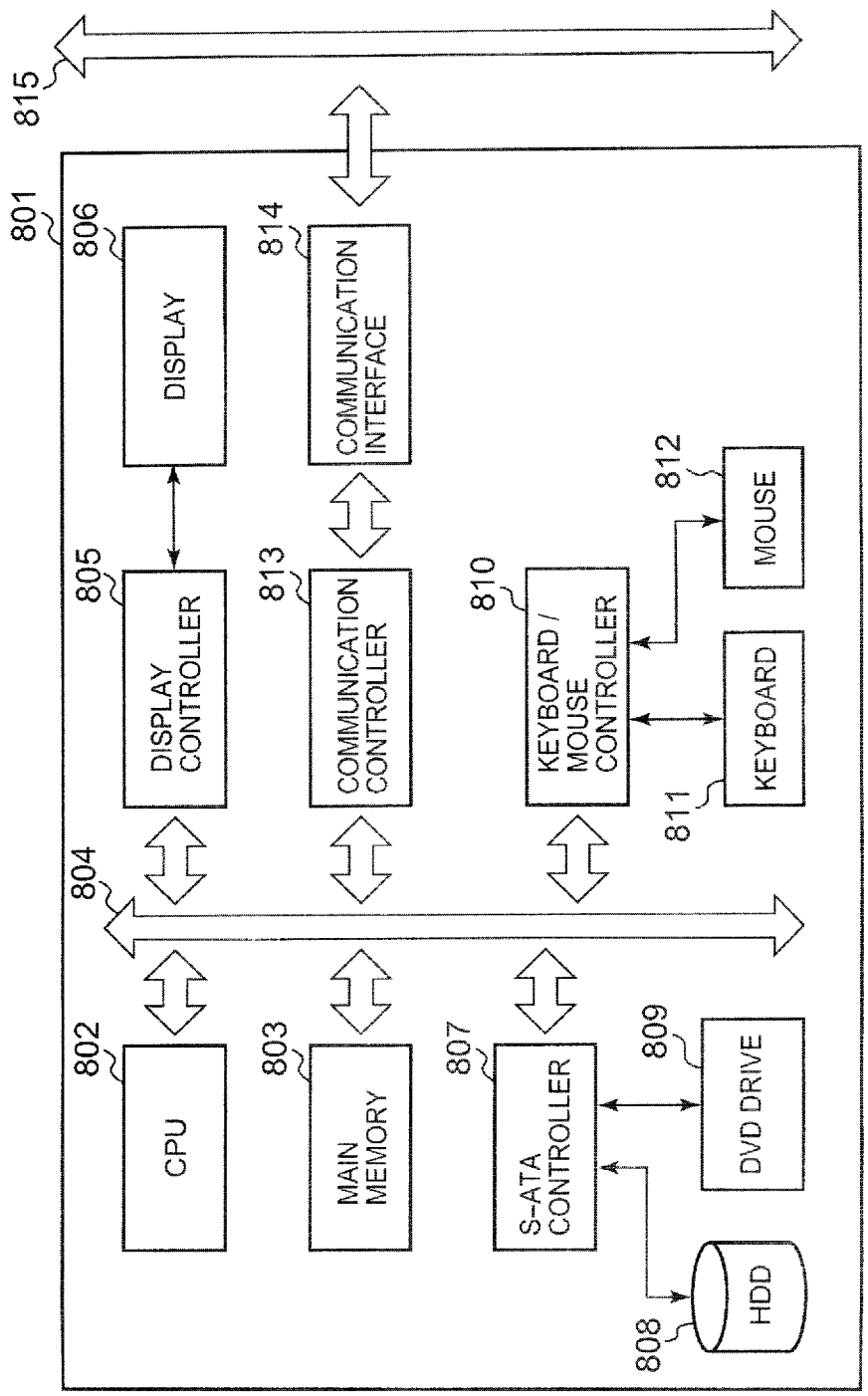
FIG. 8 is a block diagram showing the hardware of the system shown in FIG. 1A and FIG. 1B in the embodiment of the present invention.

FIG. 8 is a block diagram showing the hardware of the system shown in FIG. 1A and FIG. 1B in the embodiment of the present invention.

A computer system 801 includes a CPU 802 and a main memory 803, both connected to a bus 804. The CPU 802 is preferably based on a 32-bit or 64-bit architecture. For example, an Intel Xeon® series, Core™ series, Atom™ series, Pentium® series, or Celeron® series, or an AMD Phenom™ series, Athlon™ series, Turion™ series, or Sempron™ can be used. A display 806 such as an LCD monitor is connected to the bus 804 through a display controller 805. The display 806 is used to show, on an appropriate graphic interface, information on the computer system connected to a network through a communication line and information on software running on the computer system in order to control the computer system. A hard disk or silicon disk 808, and a CD-ROM, DVD, or BD drive 809 are also connected to the bus 804 through an IDE or SATA controller 807.

An operating system, a program providing a Java™ processing environment like J2EE, and other programs and data are stored in the hard disk 808 in such a manner to be loadable to the main memory.

The CD-ROM, DVD, or BD drive 809 is used to additionally introduce a program from a CD-ROM, DVD-ROM, or BD into the hard disk as necessary. Further, a keyboard 811 and a mouse 812 are connected to the bus 804 through a keyboard/mouse controller 810.

A communication interface 814 follows an Ethernet™ protocol, for example. The communication interface 814 is connected to the bus 804 through a communication controller 813, playing a role in physically connecting the computer system and a communication line 815 to provide a network interface layer to TCP/IP communication protocol of the communication function of the operating system for the computer system. The communication line may be a wired LAN environment, or a wireless LAN environment based on a wireless LAN connection standard such as IEEE802.11a/b/g/n.

The present invention has been described with reference to preferred embodiments thereof. However, those skilled in the art will recognize that the above and various other changes in form and details may be made without departing from the spirit and scope of the invention as set forth in the following claims.

What is claimed is:

1. A computer implemented method for ascertaining a cause of memory consumption by a program in a computer system, the method comprising the steps of:
   acquiring at least one of a first call path related to creation of an object from a memory and a first ID corresponding to said first call path, wherein the first ID is acquired from an area associated with the object in the memory;
   acquiring at least one of a second call path related to connection to the object from the memory and a second ID corresponding to said second call path, wherein the second ID is acquired from an area associated with another object in the memory, and wherein the object connects to the other object; and
   determining a common part of the first and second call paths, wherein the common part indicates the cause of memory consumption by the program, the first and second call paths including a flow of calls invoked for an execution of a process in the program;
   wherein the foregoing steps are performed by the computer system.

2. The method according to claim 1, wherein
   the computer system has a correspondence table including combinations of call paths and IDs corresponding to the call paths;
   a first ID is acquired corresponding to the first call path,
   a second ID is acquired corresponding to the second call path, and
   the determining step further includes determining, from the correspondence table, the first call path corresponding to the acquired first ID and the second call path corresponding to the acquired second ID, respectively, whereby a common part of the determined first and second call paths is determined.

3. The method according to claim 1, wherein
   a first ID is acquired corresponding to the first call path,
   a second ID is acquired corresponding to the second call path, and
   the method further comprises:
   calculating an ID from a third call path representing a calling relationship upon execution of the program before determining the common part;
   setting the third call path as the first call path when the calculated ID matches the first ID; and
   setting the third call path as the acquired second call path when the calculated ID matches the second ID.

4. The method according to claim 2, wherein the second ID is acquired from an area associated with the object in the memory.

5. The method according to claim 1, wherein a latest call included in the common part indicates the cause of memory consumption by the program.

6. The method according to claim 1, further comprising
   determining whether the object is active before acquiring the first call path and the second call path; and
   acquiring the first call path and the second call path only when the object is active.

7. The method according to claim 1, further comprising displaying the determined common part on a display section.

8. The method according to claim 7, wherein:
   when the object from the memory is referenced by only one other object, a display is provided while combining the object from the memory with the one other object.

9. A computer implemented method of ascertaining a cause of memory consumption by a program in a computer system, the method comprising the steps of:

storing, in a memory, at least one of (i) a first ID corresponding to a first call path related to the creation of an object and (ii) the first call path, wherein the first ID is stored in an area associated with the object in the memory, said storing step occurring when the program is executed to cause execution of code to create the object; and storing, in the memory, at least one of (i) a second ID corresponding to a second call path related to a connection to the object and (ii) the second call path, wherein the second ID is stored in an area associated with another object in the memory, and wherein the object in the memory connects to the another object, said storing step occurring when the program is executed to cause execution of code to connect the object in the program, wherein a common part of the first call path corresponding to the first ID and the second call path corresponding to the second ID indicates the cause of memory consumption by the program, the first and second call paths including a flow of calls invoked for an execution of a process in the program, and wherein the foregoing steps are performed by the computer system.

10. The method according to claim 9, wherein the first ID and the second ID are created by a probabilistic calling context method.

11. The method according to claim 9, wherein the computer system has a correspondence table including a combination of a call path and an ID corresponding to the call path;

the step of storing the first call path further includes registering a combination of the first call path and the first ID in the correspondence table; and the step of storing the second call path further includes registering a combination of the second call path and the second ID in the correspondence table.

12. The method according to claim 9, wherein the second ID is stored in an area associated with the object in the memory.

13. The method according to claim 9, wherein storing the first call path further includes storing at least one position in code where the object is created and an object data type; and storing the second call path further includes storing at least one position in code where the object is connected and the object data type.

14. A computer system configured to ascertain a cause of memory consumption by a program, the system comprising:

a processor comprising:

an acquisition section for acquiring, from a memory, a first call path related to creation of an object and a second call path related to connection to the object, wherein the first ID is acquired from an area associated with the object in the memory and the second ID is acquired from an area associated with another object in the memory, and wherein the object connects to the other object; and a calculation section for calculating a common part of the acquired first and second call paths, wherein the common part indicates the cause of memory consumption by the program, the first and second call paths including a flow of calls invoked for an execution of a process in the program.

15. A computer-readable storage medium tangibly embodying computer-executable program instructions which, when executed, cause a computer to perform the method according to claim 1.

* * * * *